US006333766B1

(12) United States Patent
Kougami et al.

(10) Patent No.: US 6,333,766 B1
(45) Date of Patent: Dec. 25, 2001

(54) TONE DISPLAY METHOD AND APPARATUS FOR DISPLAYING IMAGE SIGNAL

(75) Inventors: Akihiko Kougami; Masaji Ishigaki, both of Yokohama; Shigeo Mikoshiba, 2-43-17 Izumi, Suginami-ku, Tokyo 168; Takahiro Yamaguchi, 2-14-21 Higashi, Shibuya-ku, Tokyo 150; Kohsaku Toda, 257 Hamazume, Amino-cho, Takeno-gun, Kyoto-fu 629-32, all of (JP)

(73) Assignees: Hitachi, Ltd.; Shigeo Mikoshiba; Takahiro Yamaguchi; Kohsaku Toda, all of Tokyo (JP)

( * ) Notice: Subject to any disclaimer, the term of this patent is extended or adjusted under 35 U.S.C. 154(b) by 0 days.

(21) Appl. No.: 09/634,734

(22) Filed: Aug. 8, 2000

Related U.S. Application Data

(63) Continuation of application No. 08/714,409, filed on Sep. 16, 1996, now Pat. No. 6,100,939.

(30) Foreign Application Priority Data

Sep. 20, 1995 (JP) .................................................. 7-241297
Oct. 13, 1995 (JP) .................................................. 7-265156

(51) Int. Cl.[7] ...................................................... H04N 5/57

(52) U.S. Cl. ......................... 348/687; 348/800; 348/797; 348/624; 348/910; 345/690; 345/691; 345/692

(58) Field of Search ........................... 348/687, 800–803, 348/645, 646, 647, 630, 631, 624, 797, 910; 345/148, 147, 63, 60, 690, 691, 692; H04N 5/57

(56) References Cited

U.S. PATENT DOCUMENTS 3,906,290 9/1975 Kurahashi et al. .............. 340/169 R (List continued on next page.)

OTHER PUBLICATIONS

T. Kaji et al., "A Proposal of the Drive Method for TV Using AC Type Plasma Display Panel", *Image Engineers Report No. IT72–45*, Mar. 12, 1973, The Institute of Electronics and Communication Engineers of Japan (in Japanese with partial English translation).

H. Murakami et al., "A Color TV Display Using 8–Inch Pulse Discharge Panel with Internal Memory", *Journal of the Institute of Television Engineers of Japan*, vol. 38, No. 9, 1984, pp. 836–842 (in Japanese).

T. Masuda et al., "New Category Contour Noise Observed in Pulse–Width–Modulated Moving Images", *Technical Report of IEICE*, vol. 94, No. 438, EID94–126, Jan. 1995, pp. 61–66, The Institute of Electronics, Information and Communication Engineers of Japan (in Japanese with English abstract).

*Primary Examiner*—Reinhard J. Eisenzopf
*Assistant Examiner*—Jean W. Désir
(74) *Attorney, Agent, or Firm*—Antonelli, Terry, Stout & Kraus, LLP

(57) ABSTRACT

A tone display method for displaying a tone of an image in a display system which divides a time width of a field of an image signal into a plurality of weighted subfields and controls operation of the subfields. The tone display method includes the steps of coding the image signal in the plurality of weighted subfields the plurality of weighted subfields including a plurality of most significant subfields having respective weights which are substantially equal to one another, and a plurality of less significant subfields having respective weights each of which is less than each of the weights of the most significant subfields, a sum of all of the weights of the less significant subfields being greater than each of the weights of the most significant subfields, the coding being chosen from a plurality of codings all representing substantially a same tone level when a tone level of the image signal is not less than each of the weights of the most significant subfields, and displaying the image signal coded with the chosen coding.

10 Claims, 31 Drawing Sheets

U.S. PATENT DOCUMENTS

| | | | | |
|---|---|---|---|---|
| 4,383,256 | * | 5/1983 | Kurahashi et al. | 340/793 |
| 4,870,324 | * | 9/1989 | Hara | 315/169.1 |
| 5,187,578 | | 2/1993 | Kohgami et al. | 348/910 |
| 5,317,334 | | 5/1994 | Sano | 348/687 |
| 5,436,634 | | 7/1995 | Kanazawa | 345/60 |
| 5,619,228 | * | 4/1997 | Doherty | 345/148 |

* cited by examiner

TONE DISPLAY METHOD AND APPARATUS FOR DISPLAYING IMAGE SIGNAL

CROSS-REFERENCE TO RELATED APPLICATION

This application is a continuation of application Ser. No. 08/714,409 filed on Sep. 16, 1996, now U.S. Pat. No. 6,100,939.

BACKGROUND OF THE INVENTION

1. Field of the Invention

The present invention relates to a tone display method of a TV image signal and more particularly to a tone display method for displaying the tone of brightness of a luminant element by changing the luminant time width by dividing the inside of the field of a TV signal into several subfields corresponding to the pixel display time and controlling light emission of the subfields and an apparatus therefor.

2. Description of the Prior Art

As a method for displaying the tone of a TV image signal by controlling the brightness of a display element, a method for controlling the luminant time width of a luminant element is conventionally known.

For example, a memory type plasma display is described in T. Kaji et al., “A Proposal of the Drive Method for TV Using AC Type Plasma Display Panel”, Image Engineers Report No. IT72-45, Mar. 12, 1973, The Institute of Electronics and Communication Engineers of Japan. As shown in FIG. 2, this is a method for displaying the tone of brightness by dividing the time width of a field of a TV signal into 8 subfields corresponding to the pixel display time, weighting the time width of each of the 8 subfields in binary, and controlling the presence or absence of light emission of each subfield (b0 to b7 are named). In this case, each subfield shown in FIG. 2 is a time width coded in binary. However, as shown in FIGS. 3(*a*) and 3(*b*), for example, it is possible that the luminant time width in the subfields is not almost the entire of the period of the subfields (90% duty ratio in FIG. 3(*a*)) but as shown in FIG. 3(*b*) for example, the luminant time width is a half of the time width of the subfields (50% duty ratio).

A TV display example by this intra-field divided subfield system is described in H. Murakami et al., “A Color TV Display Using 8-Inch Pulse Discharge Panel with Internal Memory”, *Journal of the Institute of Television Engineers of Japan*, Vol. 38, No. 9, 1984, pp. 836–842. As shown in FIG. 4, this is display of a TV image signal by dividing the period of a field of a TV signal into 8 subfields at even intervals, weighting the luminant time width of each of the subfields in binary, and controlling the presence or absence of light emission of these subfields.

According to the aforementioned prior art, it is known that when a TV image signal is displayed actually, dynamic false contour noise is generated for a moving image. For example, in T. Masuda et al., “New Category Contour Noise Observed in Pulse-Width-Modulated Moving Images”, *Technical Report of IEICE*, Vol. 94, No. 438, EID94–126, January 1995, pp. 61–66, The Institute of Electronics, Information and Communication Engineers of Japan, when in particular, the cheek of the face and skin of a person move by a smooth tone change in the conventional tone display method, contour string noise is generated. It is described that the principle is that the luminant time pattern in several subfields in the field is converted to a spatial pattern on the retina of each eye as the viewing point of an observer moves.

As a method for reducing such dynamic false contour noise for a moving image, a method for displaying by dividing and separating some of the upper bits in a plurality of subfields is disclosed in Japanese Laid-Open Patent Application No. 4-211294 which is a publication of Japanese Patent Application No. 3-30648. However, according to this method, there is a problem imposed that the reduction of dynamic false contour noise is not sufficient and no noticeable improvement effect is produced for a rapidly moving image.

SUMMARY OF THE INVENTION

An object of the present invention is to provide a new tone display method for reducing dynamic false contour noise for a moving image greatly and an apparatus therefor.

To accomplish the above object, the present invention provides a tone display method of a TV image signal in a system having a memory for dividing the time width of a field of a TV signal into a plurality of subfields having a predetermined luminant time width respectively and displaying the tone of a TV image signal by controlling the presence or absence of light emission of the subfields and an apparatus therefor, wherein at least two subfields (most significant subfields) whose luminant time widths are longest and almost equal are generated among the plurality of subfields and when it is assumed that the tones are displayed in the ascending order starting from the lowest level of tone in light emission of the subfields, the tone of a TV image signal is displayed under a rule that two or more light emissions are not started from the aforementioned at least two most significant subfields at the same time.

Furthermore, the present invention provides a tone display method of a TV image signal in a system having a memory for dividing the time width of a field of a TV signal into a plurality of subfields having a predetermined luminant time width respectively and displaying the tone of the TV image signal by controlling the presence or absence of light emission of the subfields and an apparatus therefor, wherein the display device for displaying the tone of a TV image signal converts a TV image signal to a binary-coded signal by converting it from analog to digital and converts the binary-coded signal to a code comprising the aforementioned subfields other than a binary code (bit-subfield conversion).

More concretely, the present invention can be realized by controlling light emission of the subfields according to a TV image signal under a rule that when it is assumed that the light emission of the subfields displays the tones in the ascending order starting from the lowest level of tone, if individual light emission of the most significant subfields is made once, the light emission is continued until the highest level of tone is displayed.

Furthermore, the present invention can be realized if at least one most significant subfield exists in the time position in a field of a TV signal of a subfield other than the most significant subfields (hereinafter called a lower subfield) both before and after the time position of the lower subfield respectively.

Furthermore, the present invention can be realized if when it is assumed that the tones are displayed in the ascending order starting from the lowest level of tone, with respect to the order of individual light emission of the most significant subfields, one of the most significant subfields on both sides of the time of the lower subfield is first and when the display in the ascending order is continued further, the next light emission of the most significant subfield is light emission of the remaining most significant subfield on both sides of the time of the lower subfield.

Furthermore, the present invention can be realized when the number of most significant subfields is 2 and the luminant time width of each of a plurality of subfields is binary coded except one of the most significant subfields.

Furthermore, the present invention can be realized when the number of subfields is 8 and the ratio of luminant time widths of a plurality of subfields is 1:2:4:8:16:32:64:64.

Furthermore, the present invention can be realized when two most significant subfields are positioned at the first and last of a field of a TV signal.

Furthermore, the present invention can be realized when the number of most significant subfields is 3 and the ratio of luminant time widths of subfields is binary coded except two of the most significant subfields.

Furthermore, the present invention can be realized when the number of subfields is 9 and the ratio of luminant time widths of a plurality of subfields is 1:2:4:8:16:32:64:64:64.

Furthermore, in this case, the present invention can be realized when two of the most significant subfields are positioned at the first (or last) of a field of a TV signal and one of the remaining most significant subfields is positioned at the last (or first) of the field of the TV signal.

Furthermore, in this case, the present invention can be realized when the time order of the subfields is "64, 1, 2, 4, 8, 16, 64, 32, 64" in a ratio of luminant time widths of the subfields or the reverse order thereof.

Furthermore, the present invention can be realized when the number of most significant subfields is 4. In this case, the present invention can be realized when the ratio of luminant time widths of the subfields is set so that one of the most significant subfields is smaller than the total luminant time width of all the lower subfields.

In this case, the present invention can be realized when the ratio of luminant time widths of the lower subfields among a plurality of subfields is binary coded.

In this case, the present invention can be realized when the number of subfields is 10 and the ratio of luminant time widths of the subfields is 1:2:4:8:16:32:48:48:48:48.

Furthermore, the present invention can be realized when the time positions of the four most significant subfields in a field of a TV signal are in the order of the most significant subfield, the most significant subfield, the lower subfields, the most significant subfields, and the most significant subfield.

Furthermore, in this case, the present invention can be realized when the time order of the subfields in a field of a TV signal is 48, 48, 1, 2, 4, 8, 16, 48, 32, and 48 in a ratio of luminant time widths of the subfields or the reverse order.

Furthermore, in this case, the present invention can be realized when the time order of the subfields in a field is 48, 48, 16, 8, 4, 2, 1, 32, 48, and 48 in a ratio of luminant time widths of the subfields or the reverse order.

Furthermore, in a case that when four most significant subfields among the aforementioned plurality of subfields are generated, the luminant time widths of subfields (lower subfields) other than the aforementioned most significant subfields are binary coded and when it is assumed that the tones are displayed in the ascending order starting from the lowest level of tone in light emission of the subfields, the tone of a TV image signal is displayed under a rule that two or more light emissions of the aforementioned at least two most significant subfields are not started at the same time and when two of the aforementioned four most significant subfields emit light, the two most significant subfields emitting light are not adjacent to each other in a field on a time basis, an actual constitution as shown below is available.

The present invention can be realized when the aforementioned plurality of lower subfields are arranged in positions continued on a time basis and one of the most significant subfields emitting light first in the tone ascending order is one of the most significant subfields neighboring the lower subfields.

Furthermore, the present invention can be realized when a plurality of lower subfields are arranged in positions continued on a time basis and when three most significant subfields among the four most significant subfields emit light in the tone ascending order, the three most significant subfields emitting light are not continued on a time basis.

Furthermore, the present invention can be realized when the number of subfields is 10 and the ratio of luminant time widths of the subfields is almost 1:2:4:8:16:32:48:48:48:48.

Furthermore, the present invention can be realized when the number of light emitting most significant subfields having a ratio of luminant time width of 48 in the tone ascending order is maximized.

Furthermore, in this case, the present invention can be realized when the tone is changed in the ascending order between the tone levels of 47 and 64, or between 95 and 112, or between 143 and 160, or between 191 and 208, the light emission of the most significant subfield having a ratio of luminant time width of 48 is changed only once.

Furthermore, the present invention can be realized when the lower subfields having a ratio of luminant time width of 16 and 32 respectively are the first (last) and last (first) of the line of the lower subfields on a time basis in the time positions of the lower subfields.

Furthermore, the present invention can be realized when the tone level at which the light emission of the most significant subfield is changed varies with a neighboring pixel or neighboring line of the display device.

Furthermore, the present invention can be realized when the tone level at which the light emission of the most significant subfield is changed varies with a field of a TV signal.

Furthermore, the present invention can be realized when the tone level at which the light emission of the most significant subfield is changed varies with both a neighboring pixel or a neighboring line of the display device and a field of a TV signal.

Next, in a case that at least three subfields (most significant subfields) whose luminant time widths are longest and almost equal are generated among the aforementioned plurality of subfields, a modification as shown below is available.

When it is assumed that the tones are displayed in the ascending order starting from the lowest level of tone in light emission of the aforementioned subfields, the tone of a TV image signal is displayed under a rule that the integral value of luminant time over a time zone of about one field period of a TV signal becomes uniform as much as possible over the time width of a field in an optional time position for all the tone changes.

Furthermore, the tone of a TV image signal is displayed under a rule that when the tone changes, the correlation between light emission patterns of light emitting subfields in two fields before and after the tone change is obtained and the correlation becomes highest.

Furthermore, the tone of a TV image signal is displayed under a rule that when the tone changes, the correlation between pixel appearances when the viewing point of an observer moves before and after the tone change is obtained and the correlation becomes highest.

Furthermore, the tone of a TV image signal is displayed under a rule that when the tone changes, the correlation between light emission patterns of subfields emitted from two fields before and after the tone change is obtained and when it is assumed that the tones are displayed in the ascending order starting from the lowest level of tone in light emission of the aforementioned subfields, the sum of all correlations between tone changes becomes highest.

Furthermore, the tone of a TV image signal is displayed under a rule that when the tone changes, the correlation between pixel appearances when the viewing point of an observer moves before and after the tone change is obtained and when it is assumed that the tones are displayed in the ascending order starting from the lowest level of tone, the sum of all the aforementioned correlations between pixel appearances becomes highest.

The present invention having the aforementioned constitution performs the function and operation indicated below.

Firstly, the generation principle of dynamic false contour noise in a moving image will be explained and then it will be explained that the present invention is valid in reduction of this dynamic false contour noise.

FIGS. 5 and 6 are drawings for explaining the pixel appearance by movement of the viewing point.

FIG. 5 is a drawing showing patterns of a luminant cell A and a luminant cell B on the retina when the viewing point moves to the right. It is assumed that the luminant cell A and the luminant cell B are a 256-tone display system shown in FIG. 3(*a*) respectively, and the luminant cell A emits light at the brightness of Level 127 (light emission of b0 to b6) in the first field and emits light at the brightness of Level 128 (light emission of b7) in the second field, and the first field and the second field are almost the same in brightness. It is assumed that the luminant cell B emits light at the brightness of Level 127 (light emission of b0 to b6) both in the first and second fields. In this case, as shown in FIG. 5, the luminant cell A emits light in the first half of the first field and emits light in the second half of the second field. In this case, if the viewing point of an observer moves to the right in FIG. 5, the brightness of each of the luminant cells A and B on the retina, as shown in FIG. 5, is at an interval of T1 in the first field and at an interval of T2 in the second field. The interval T2 between the luminant cells A and B in the second field is wider than T1 in the first field.

If this luminant pattern moves by the luminant cells successively as the display image moves and an observer follows it by the viewing point, the pattern on the retina is observed as if the image moves at an interval of T2. Therefore, in such a case, the pattern is observed as a dark stripe pattern in which the interval of luminant cells is widen. This is called dynamic false contour noise.

On the other hand, FIG. 6 is a drawing showing the visible status of the luminant cells A and B when the viewing point moves to the left. Assuming that the luminant patterns of the luminant cells A and B are the same as those shown in FIG. 5, with respect to the brightness of each of the luminant cells A and B on the retina, if the viewing point of an observer moves to the left, as shown in FIG. 6, the interval between the luminant cells A and B in the second field is T2. This is narrower than the interval T1 between the ruminant cells A and B in the first field. If this luminant pattern moves through the luminant cells successively as the display image moves and an observer follows it by the viewing point, the pattern on the retina is observed as if the image moves at a narrow interval of T2. Therefore, if the viewing point moves as the image moves, the pattern is observed as a bright stripe pattern.

The reason for that dynamic false contour noise is generated as the viewing point moves like this is that the time position of the subfield emitting light changes greatly regardless of a change at almost the same brightness (brightness of Level 127 and brightness of Level 128). Therefore, to reduce dynamic false contour noise, it is desirable to display so that the time position of a subfield emitting light changes little for a slight change of brightness.

As long as tone display comprises subfields having a binary-coded time width respectively, this cannot be realized. Therefore, when two or more most significant subfields are provided and the most significant subfields are structured so that the luminant status changes little for a slight change of the tone, the dynamic false contour noise can be reduced.

According to the present invention, since a TV image signal is displayed under a rule that when two or more most significant subfields are provided and the tones are displayed in the ascending order starting from the lowest level of tone, two or more most significant subfields do not start light emission at the same time and if the most significant subfields emit light once, the light emission is continued until display of the level of highest tone, the time position of the subfield emitting light does not change so much even for a smooth tone change and dynamic false contour noise can be reduced.

When a plurality of most significant subfields are separated from the lower subfields greatly, the time position of the subfield emitting light changes greatly for a change in light emission from the lower subfields to the most significant subfields. To prevent it, it is desirable that a plurality of most significant subfields are arranged at the beginning and end positions of the field and the lower subfields are arranged in the almost middle position of the field.

When there are three or more most significant subfields, if the light emission order of the most significant subfields is set so that the most significant subfields on both sides of the lower subfields are displayed first for display of the tone ascending order, the luminant pattern in the field changes little for a smooth tone change.

It is considered desirable that the number of tones of a TV image is 256. However, due to a restriction on the response time of the display device, a smaller number of tones may be used for display. For example, when the number of tones is 192, it is desirable that two most significant subfields are provided, and the brightness of each of the most significant subfields is on Level 64, and the lower subfields comprise a binary code of b0 to b5. In this case, the number of subfields is 8 in total. At this time, when the two most significant subfields are arranged in the first and last time positions of the field, the luminant pattern in the field changes little for a smooth tone change.

When the number of tones is 256, it is possible to provide three most significant subfields. In this case, the brightness of each of the most significant subfields is on Level 64 and the lower subfields are a binary code of b0 to b5. The total number of subfields at this time is 9. With respect to the time positions of the most significant subfields, there are two methods available such as a method for arranging two most significant subfields in the first position of the field and one in the last position and a method for arranging one most significant subfield in the first position of the field and two in the last position. In either case, if the light emission order of the most significant subfields is set so that the most significant subfields on both sides of the lower subfield are displayed first for display of the tone ascending order, the luminant pattern in the field changes little for a smooth tone change.

Even if the tone is changed from the lower subfields to the most significant subfields, dynamic false contour noise is generated. To reduce it, when one of the lower subfields having the longest luminant time is interchanged with one of the most significant subfields, dynamic false contour noise when the brightness is low can be reduced.

When the number of tones is 256 in the same way, four most significant subfields are provided, and the brightness of each of the most significant subfields is on Level 48, and the lower subfields are a binary code of b0 to b5. The total number of subfields at this time is 10. The arrangement of the most significant subfields is in the order of the most significant subfield, the most significant subfield, the lower subfield, the most significant subfield, and the most significant subfield from the first position of the field. The light emission order of the most significant subfields is set so that one of the most significant subfields on both sides of the lower subfields is displayed first for display of the tone ascending order and when the display in the tone ascending order is continued next, one of the subfields on both sides of the remaining lower subfields is displayed, so that dynamic false contour noise can be reduced for a change of the tone at high brightness (dynamic false contour noise is conspicuous) in particular.

Even if four most significant subfields are provided, when the tone is changed from the lower subfields to the most significant subfields, dynamic false contour noise is generated. Also in this case, if one of the lower subfields having the longest luminant time is interchanged with one of the most significant subfields, dynamic false contour noise when the brightness is low can be reduced.

In particular, when the generation status of dynamic false contour noise is analyzed and experimented for a case that four or three or more most significant subfields are provided, it is found that when the distribution of subfields emitting light is dispersed in a field, the dynamic false contour noise can be reduced remarkably.

As long as tone display comprises subfields having a binary-coded luminant time width respectively, this light emission cannot be dispersed. Therefore, it is desirable that four most significant subfields are provided and the distribution of light emission of the four most significant subfields is dispersed as much as possible.

According to the present invention, when four most significant subfields are provided and two of them emit light, if the light emissions are dispersed so that they do not neighbor with each other in a field on a time basis, even if the viewing point moves due to a change of the tone of a moving image, dynamic false contour noise can be reduced.

When three of the four most significant subfields emit light, if they emit light at intervals instead of continuous on a time basis, the light emission distribution in a field when the brightness is high is dispersed.

When one of the four most significant subfields which emits light first when the brightness is low is one of the subfields on both sides of the lower subfields, the change of light emission is minimized and dynamic false contour noise is reduced.

It is said that a TV signal requires 256 tones. In this case, the luminant ratio of the four most significant subfields is 48 and the luminant ratio of the lower subfields is 1:2:4:8:16:32 in a 6-bit binary code. In this case, the total number of subfields is 10.

In the lower subfields, the tone levels of 0 to 63 can be displayed. Therefore, the lower subfields display Levels 0 to 47, lets the most significant subfields (the luminant ratio is 48) emit light at the next Level 48, and maximizes the light emission of the most significant subfields so as to disperse the light emission distribution more.

Since the lower subfields can display the tone Levels 0 to 63, the light emission of the most significant subfields can be changed at an optional tone level between the levels. Therefore, when the tone level of a change of light emission of the most significant subfields is made random in a pixel, line, or field, dynamic false contour noise on the screen can be made random and inconspicuous. In this case, when the tone level is between 48 and 63, or between 96 and 111, or between 144 and 159, or between 192 and 207, the light emission of the most significant subfields can be changed. Therefore, when the change level of light emission of the most significant subfields is changed in neighboring pixels, or lines, or fields, the dynamic false contour noise can be dispersed on the screen and made inconspicuous to an observer. In this case, a most significant subfield with a minimum of changes has a minimum of dynamic false contour noise, so that the light emission of the most significant subfields changes only once between the aforementioned tone levels.

It is found experimentally that when the lower subfields are arranged continuously on a time basis, an image of good quality is obtained. In this case, when two lower subfields having highest luminant ratios such as 16 and 32 are arranged at both ends of the line of the lower subfields, the light emission distribution can be dispersed most.

When the light emission of each subfield in a field is dispersed most, the integral value of luminant time from an optional time position in the time width in a field is almost constant. In a case of a still image, this relationship is always held. When the light emission in a subfield changes in a case of a moving image, if there is a rule that even if the integral value of this luminant time is measured at any point of time over the time zone in a field, it becomes constant most, the dynamic false contour noise of a moving image can be minimized. This is applied to a case that the number of most significant subfields is 3 or more.

When the light emission in a subfield in a moving image changes least, the dynamic false contour noise is reduced. In this case, it is desirable that the correlation of subfields emitting light in a field before and after tone change is maximized. There are two methods available for it, such as a method of carrying out operations always so as to maximize the correlation of luminant patterns before and after a field of a tone changing according to a TV image signal and a method of fixing the tone display method so as to maximize the total of correlations when the tone is changed in the ascending order from the lowest level to the highest level.

Although equivalent to the above, when the viewing point of an observer moves, a time luminant pattern is converted to a spatial luminant pattern. Therefore, the pixel appearance varies with the time luminant pattern. In this case, when the correlation of pixel appearances due to a tone change of TV image signal is maximized, the dynamic false contour noise is reduced. There is another method of deciding a pixel arrangement available so as to maximize the total of correlations of pixel appearances when the tone is changed in the ascending order and a luminant pattern in a subfield.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

Embodiments in which the present invention is applied to a plasma display panel will be described hereunder.

Figure 7:
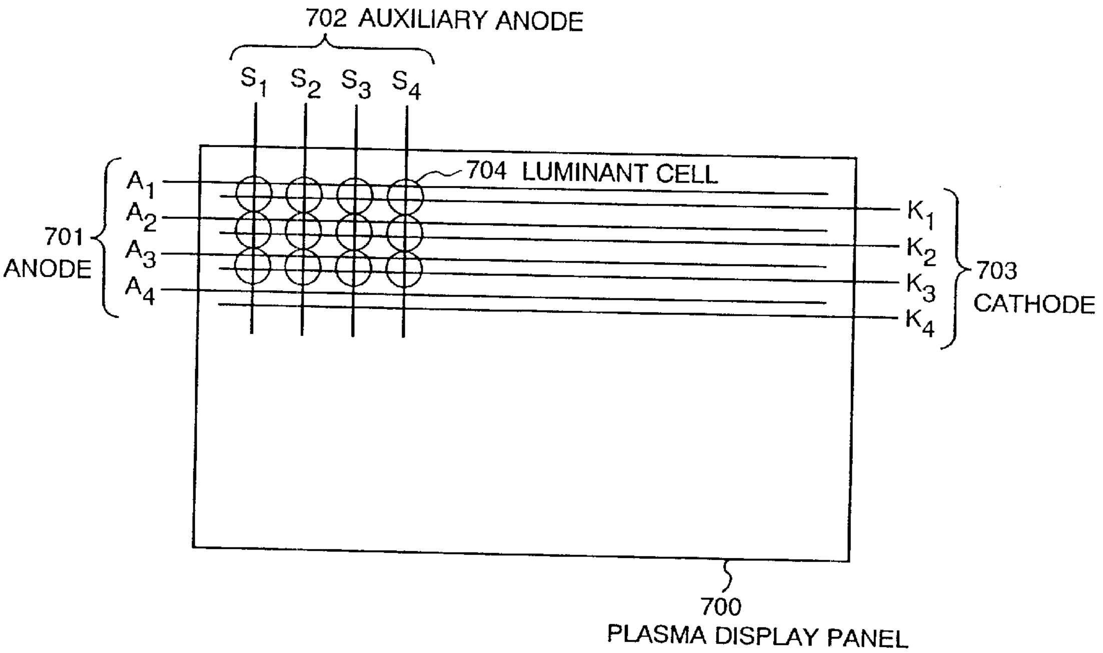
FIG. 7 is an electrode wiring diagram of plasma display TV.

Firstly, the structure of a plasma display panel will be explained. FIG. 7 is a drawing showing electrode wiring of a plasma display panel 700. The drawing shows an example of three electrodes structure of an anode A 701, an auxiliary anode S 702, and a cathode K 703. The anode 701 and the cathode 703 are wired horizontally and the auxiliary anode 702 is wired vertically. The intersection point of the anode A, the cathode K, and the auxiliary anode S constitutes a cell 704. Three color phosphors of R (red), G (green), and B (blue) are coated on each cell independently and three cells constitute a picture element.

Figure 8:
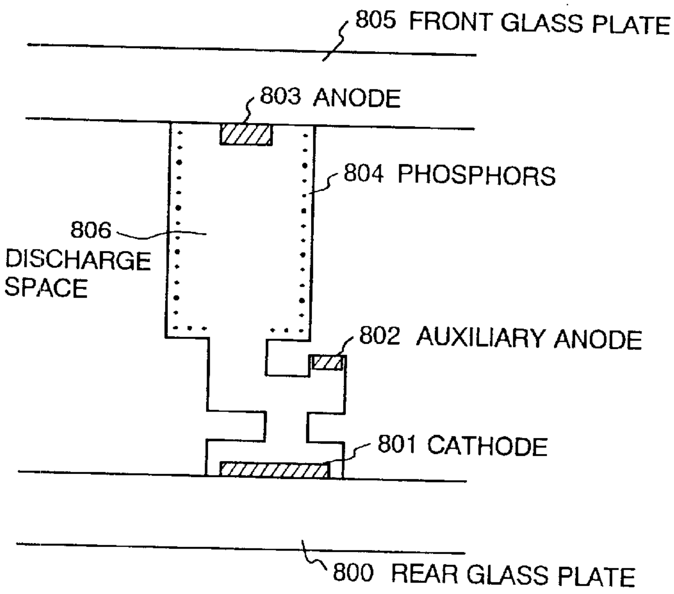
FIG. 8 is a cross sectional view of a cell of plasma display TV.

FIG. 8 is a drawing showing the cross section of a cell. A cathode 801 is formed on a rear glass plate 800 by printing and baking. A resistor may be formed on the cathode 801 at the same time. A discharge space 806 is formed by overlaying spacers having a plurality of holes and an auxiliary anode 802 is formed halfway. On the other hand, an anode 803 is formed on a front glass plate 805 by printing and baking. One of the phosphors of R, C, and B is coated on the wall surface of the discharge space 806. A discharge cell comprising these is sealed hermetically and evacuated and then gas such as Xe, Ne—Xe, or He—Xe is charged into it.

Figure 9:
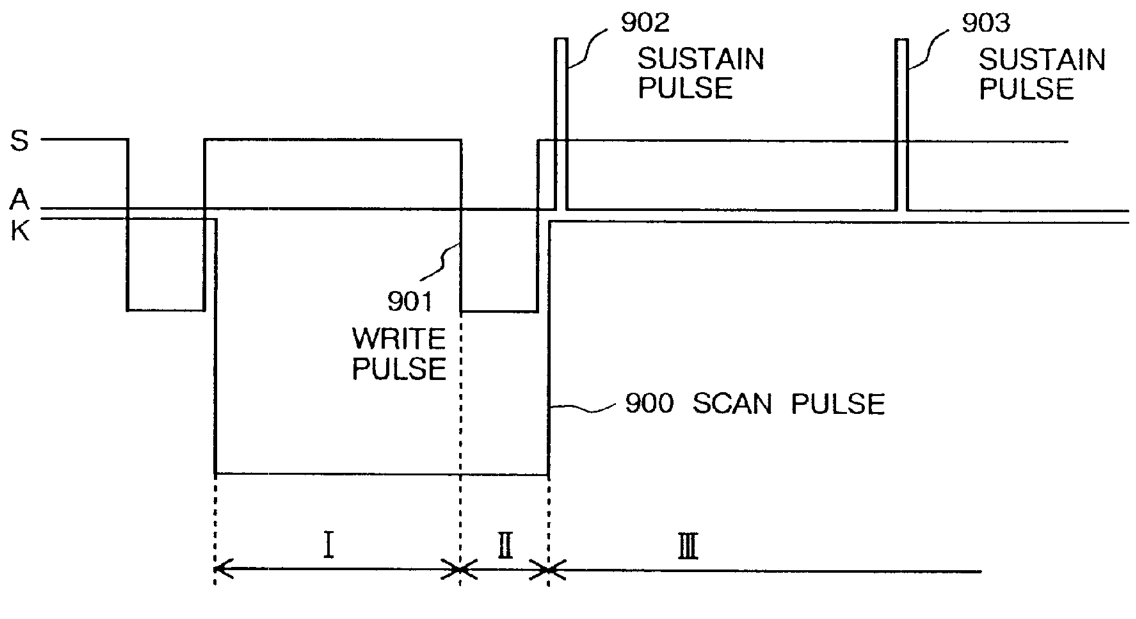
FIG. 9 is an illustration for the driving method of plasma display TV.

Next, the voltage waveform applied to each electrode is shown in FIG. 9 and the discharge status of a cell will be explained. A scan pulse 900 is applied to the cathode K. The width of this scan pulse is a time width obtained by dividing 1 H (horizontal scanning period of a TV signal) by the number of subfields. On the other hand, a write pulse 901 corresponding to a TV image signal is applied to the auxiliary anode in synchronization with the scan pulse applied to this cathode. The presence or absence of this write pulse varies with a TV image signal. On the other hand, a sustain pulse 902 is applied to the anode immediately after the scan pulse 900 is applied to the cathode. This sustain pulse contributes to light emission of display.

Next, the discharge status in the periods I, II, and III shown in FIG. 9 will be explained. When the scan pulse is applied to the cathode K, a priming discharge is ignited between the cathode and the auxiliary anode in the period I. This priming discharge is ignited in a position which is screened by the spacer when it is observed from the front glass plate in FIG. 8, so that it does not contribute to display. Next, when the write pulse 9C1 is applied to the auxiliary anode S in the period II, the discharge is switched to between the cathode and the anode. By this discharge switching, a lot of electrons and charged particles are generated in the discharge space 806 shown in FIG. 8. Next, when the sustain pulse 902 is applied to the anode A in the period III, since charged particles generated in the discharge space 806 in the period II remain, the sustain pulse 902 applied to the anode A discharges between the anode and the cathode. When this first sustain pulse 902 discharges, charged particles are generated further in the discharge space 806 and a next sustain pulse 903 also discharges. The discharge of sustain pulses continues until the sustain pulse is interrupted or a new erase pulse is applied to the cathode. When the sustain pulse discharges, ultraviolet rays are generated from the Xe gas in the discharge space 806 and excite the phosphors 804 so as to emit light. To prevent the sustain pulse applied to the anode from discharge (the cell does not emit light), the write pulse 901 is not applied to the auxiliary anode S. If this occurs, the discharge between the anode and the cathode is not switched in the period II and no charged particles are generated in the discharge space 806, so that even if the sustain pulse 902 is applied to the anode, it does not discharge and neither the next sustain pulse 903 discharges. As mentioned above, a function that if the sustain pulse immediately after the scan pulse 900 is applied discharges, subsequent sustain pulses automatically discharge is called a pulse memory.

Next, the tone display method will be explained. When the sustain pulse discharges, the phosphors emit light and the tone is displayed. The period during which the sustain pulse is applied is the light emission period assigned to a subfield. Control of light emission of this subfield is executed by the presence or absence of a write pulse applied to the auxiliary anode. Therefore, by controlling the presence or absence of this write pulse according to a TV image signal, the light emission of the subfield can be controlled and the tone can be controlled by a combination of subfield luminant periods.

Figure 1:
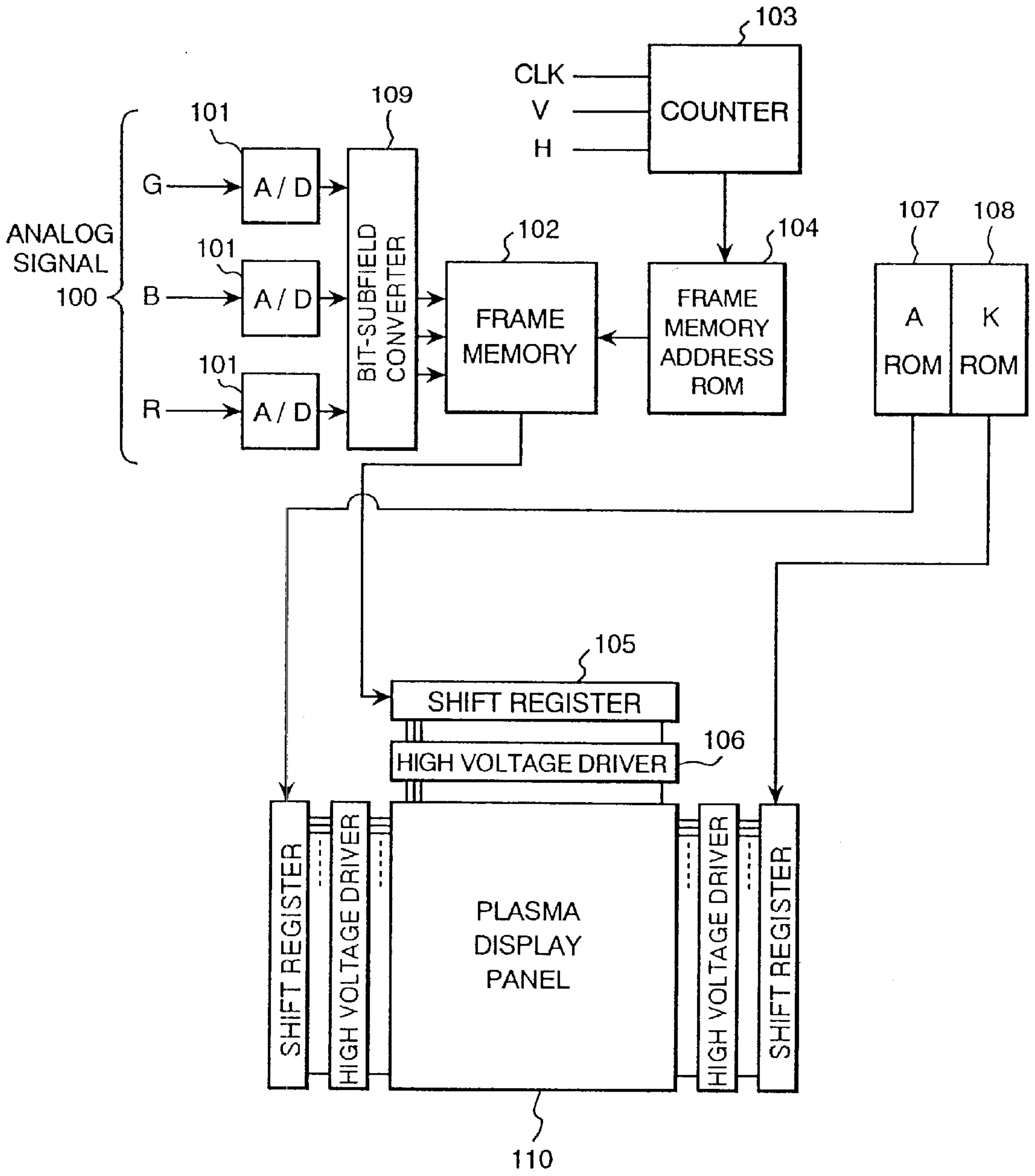
FIG. 1 is a circuit block diagram of plasma display TV showing an embodiment of the present invention.
Figure 2:
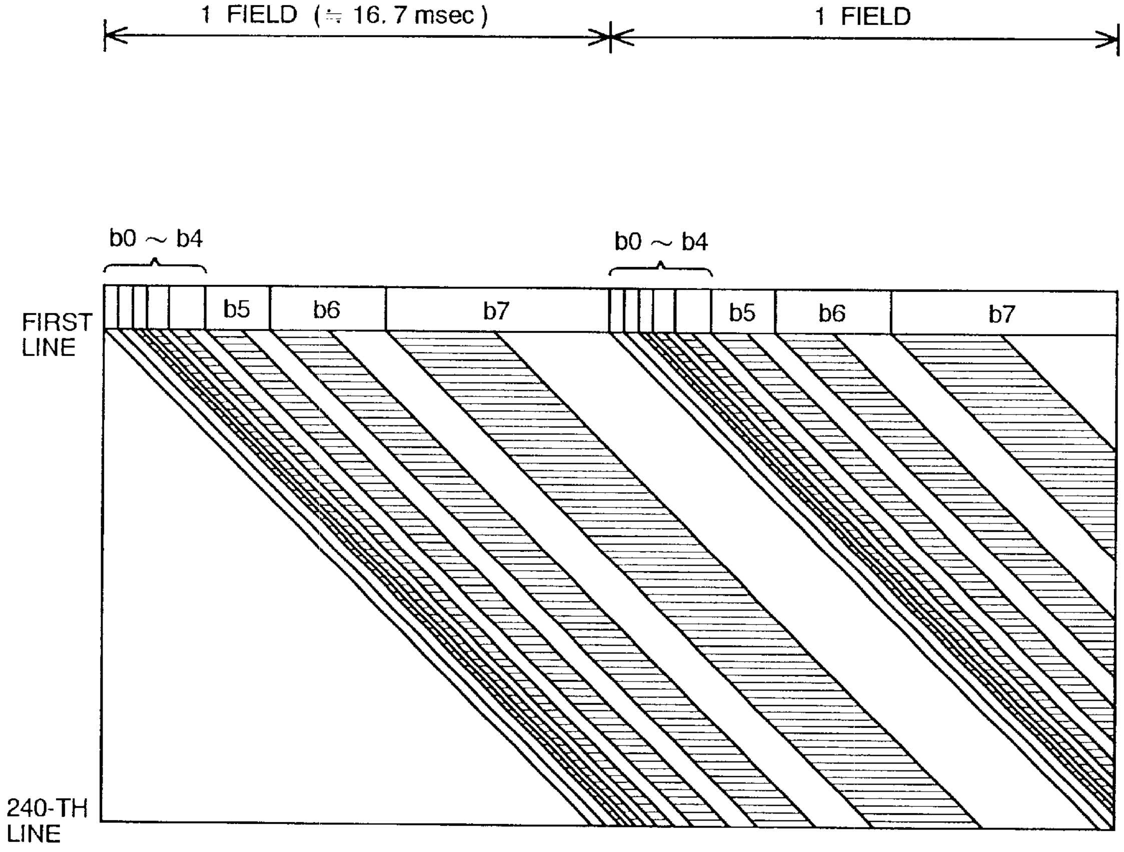
FIG. 2 is a drawing showing an example of the conventional tone display method.
Figure 3A:
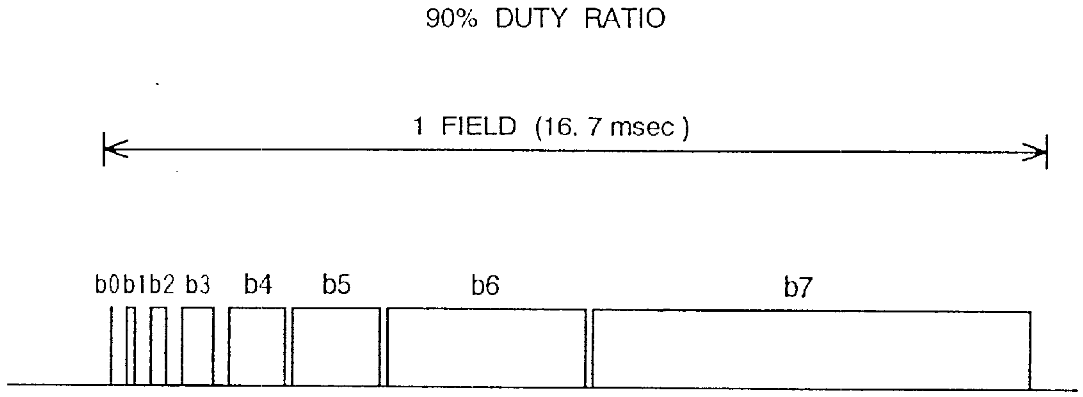
FIGS. 3(*a*) and 3(*b*) are drawings showing another example of the conventional tone display method.
Figure 3B:
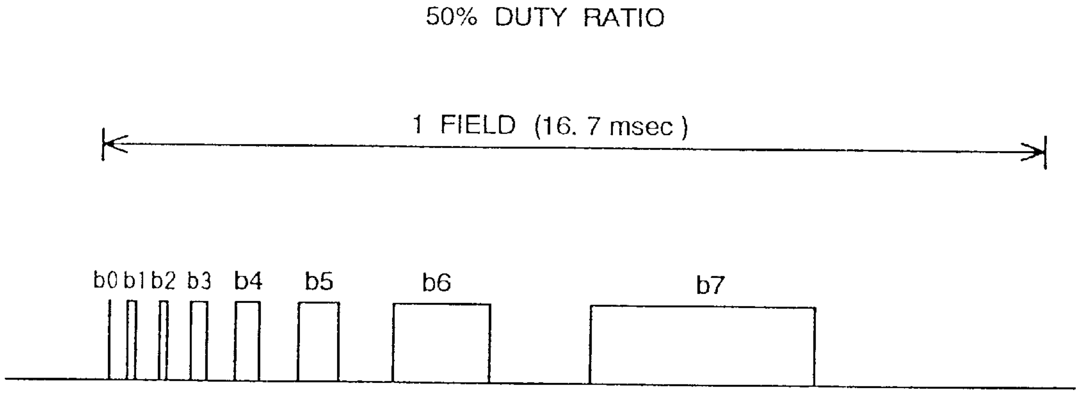
Figure 4:
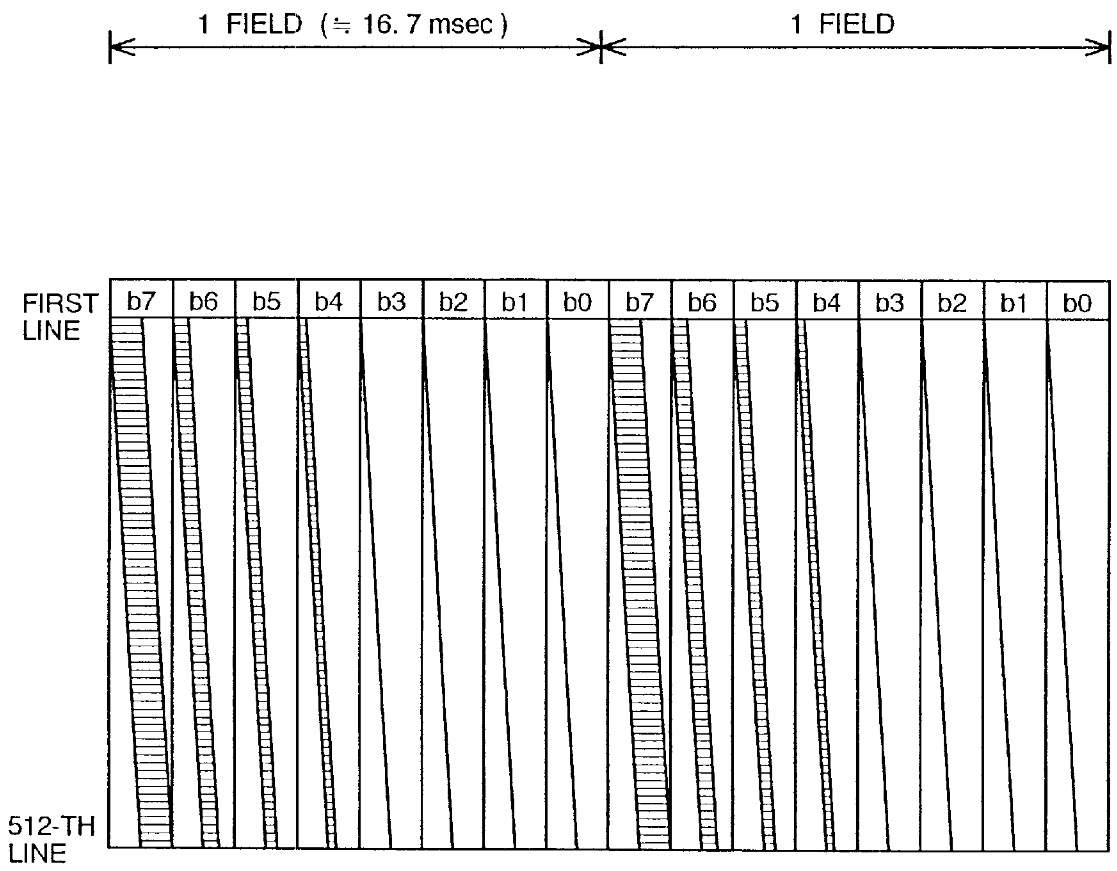
FIG. 4 is a drawing showing another example of the conventional tone display method.
Figure 5:
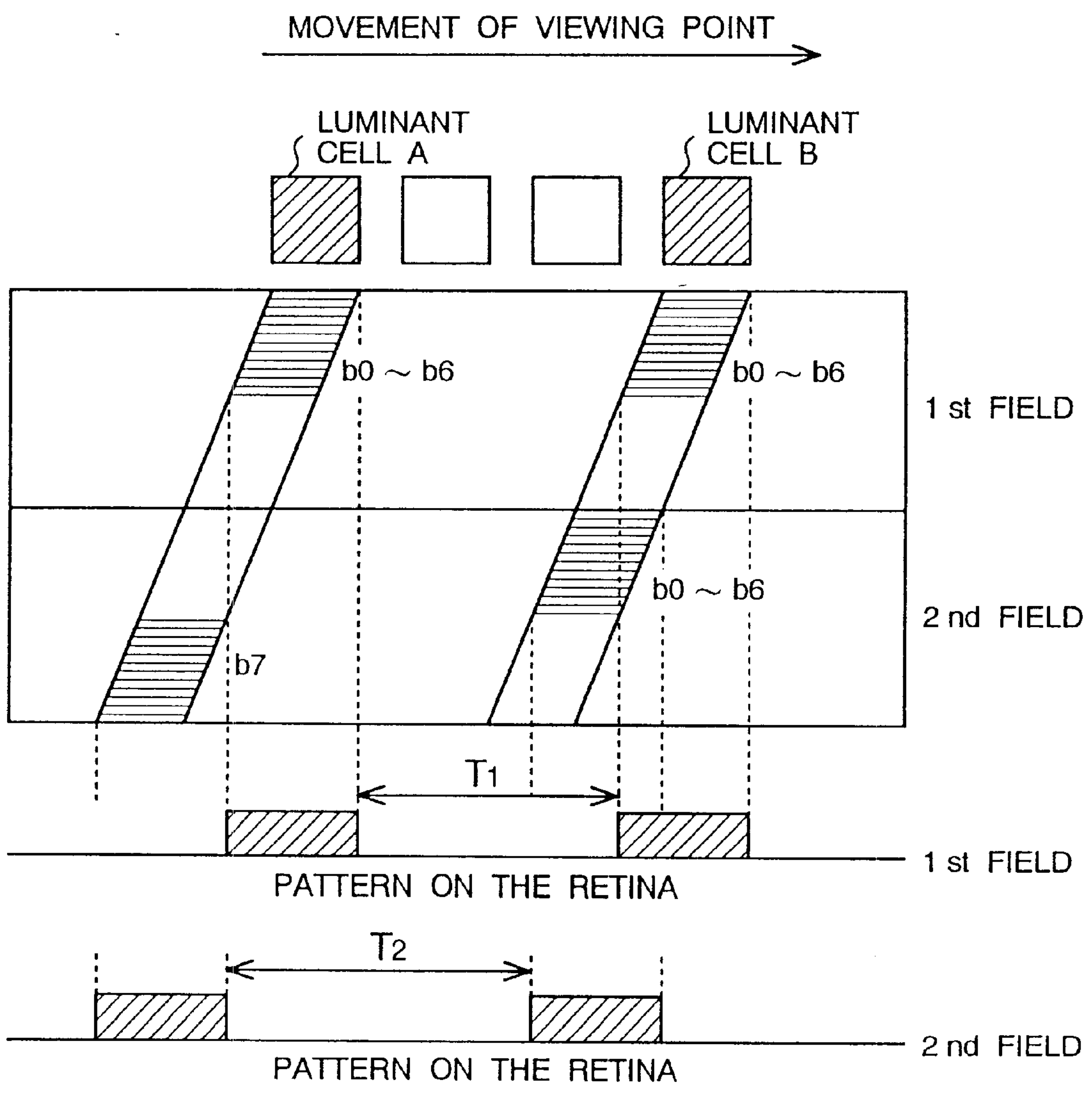
FIG. 5 is an illustration for the generation principle of dynamic false contour noise.
Figure 6:
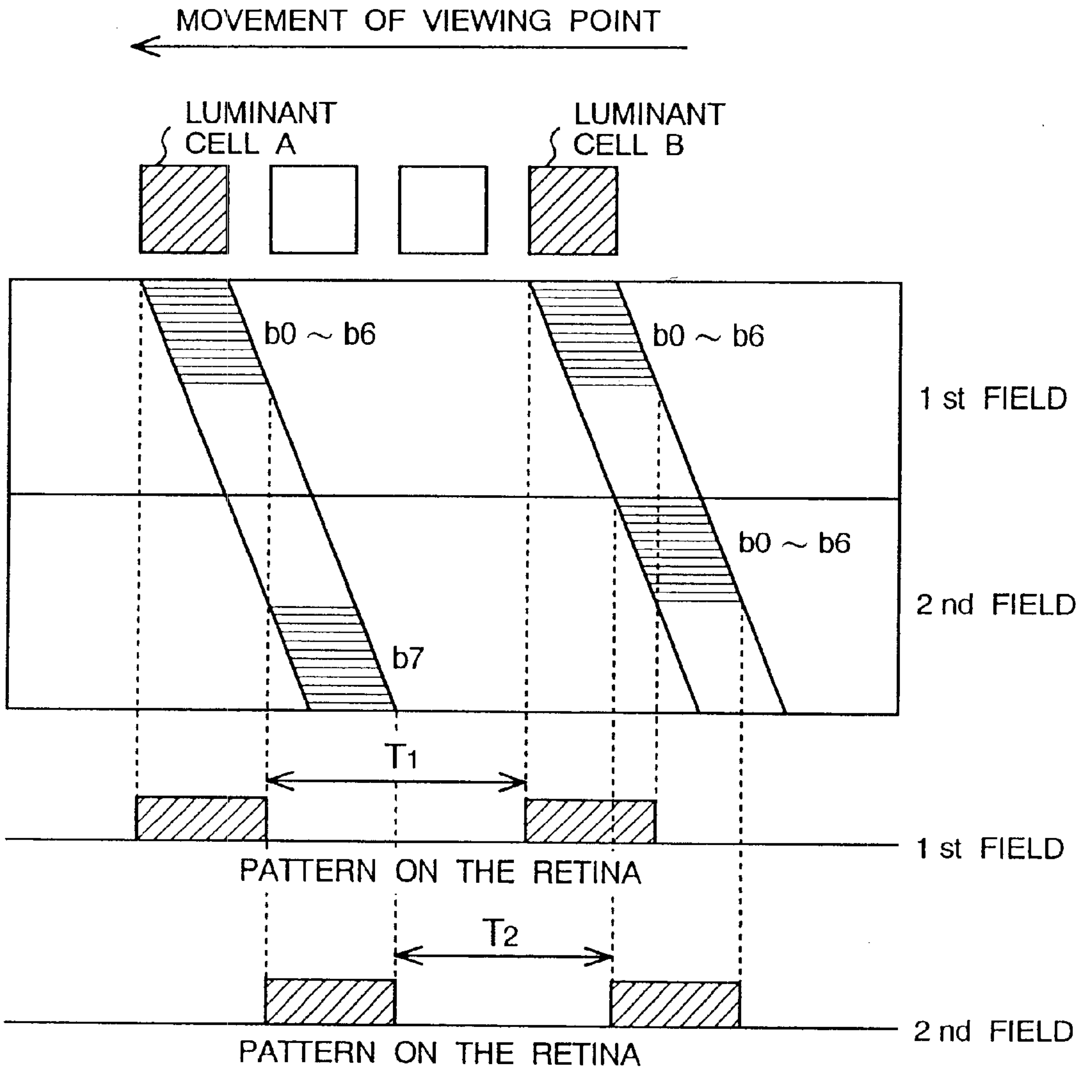
FIG. 6 is another illustration showing the generation principle of dynamic false contour noise.

Next, a case that the present invention is applied to a plasma display TV set will be explained by referring to FIG. 1. An analog signal 100 of each tri-color of a TV image signal is converted to a digital signal by an A-D converter 101. In this case, the gamma-characteristics are applied to a broadcasting TV image signal and the plasma display panel is linear to an image signal, so that reverse compensation of gamma is necessary. Although it is omitted in FIG. 1, it is possible to compensate it by a tri-color analog signal or to compensate it by a digital signal after A-D conversion. A TV image signal converted to a digital binary code by the A-D converter is converted to a signal fitted to tone display of plasma TV by a bit-subfield converter 109 which is one of the components of the present invention so as to convert it to a code corresponding to the tone comprising subfields. This coded signal is stored in a frame memory 102 once. Next, a frame memory address ROM 104 is driven from a clock signal generated from a TV signal and V (vertical synchronizing signal) and H (horizontal synchronizing signal) of the TV signal via a counter 103. In the frame memory address ROM 104, data of the information of the TV signal in the frame memory which is to be read at the time fitted to the operation of the plasma display panel 110 is written and the ROM drives the frame memory address. The TV image signal read from the frame memory 102 is serialized via a shift register 105, converted to a high voltage pulse by a high voltage driver 106, and applied to the auxiliary anode of the plasma display panel 110. On the other hand, the scan pulse applied to the cathode and the sustain pulse applied to the anode are read by a K ROM 108 and an A ROM 107 at the time fitted to the operation of the plasma display panel 110, converted to high voltage pulse signals via each shift register and high voltage driver, and applied to the cathode and anode on the plasma display panel 110.

Next, the tone display method of the present invention will be explained with reference to FIGS. 10(*a*)–10(*b*), 11(*a*)–11(*c*), 12(*a*)–12(*b*), 13(*a*)–13(*c*), and 14(*a*)–14(*b*) Tables 1 to 3.

Figure 10A:
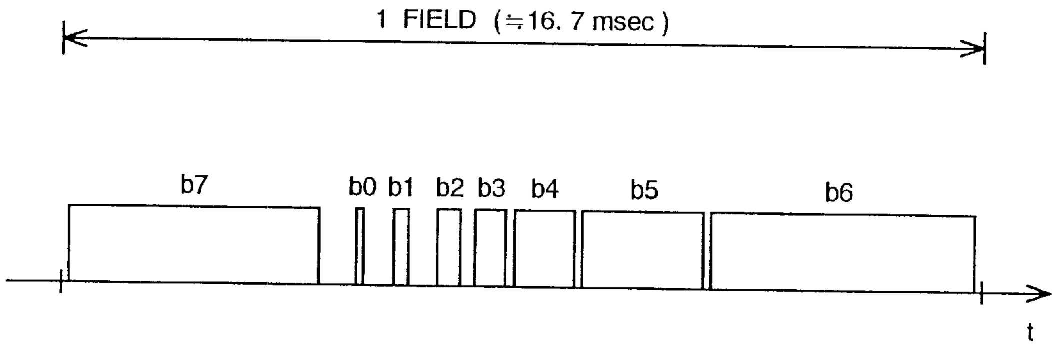
FIGS. 10(*a*) and 10(*b*) are illustrations for an example of the tone display method of the present invention.
Figure 10B:
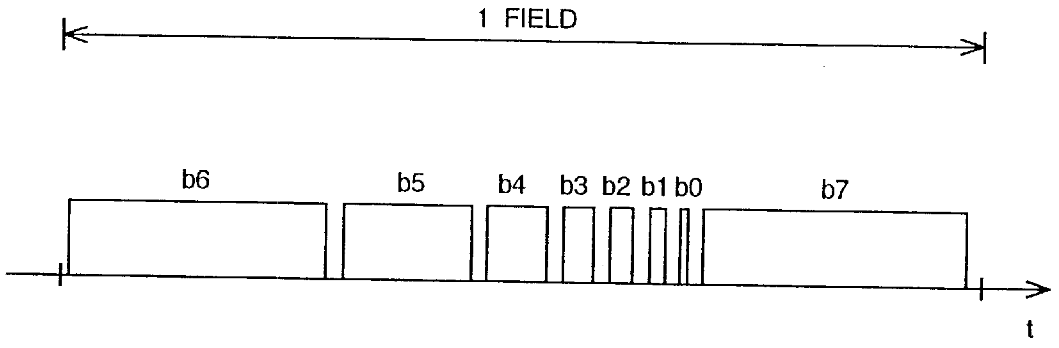

FIG. 10(*a*) shows an arrangement of each subfield in a field of a TV signal when two most significant subfields (named b6 and b7) are provided. The most significant subfields b6 and b7 are arranged at the beginning and end of a field and the lower subfields (named b0 to b5) are arranged between them in the ascending order of luminant time widths of the lower subfields. The luminant time widths of the subfields b0 to b6 are binary coded such as b0:b1:b2:b3:b4:b5: b6:b7=1:2:4:8:16:32:64:64. In this case, the number of tones is 192. FIG. 10(*b*) shows an arrangement of each subfield when the time order of each subfield shown in FIG. 10(*a*) is reversed and both cases are included in the present invention.

Table 1 shows the light emission rule of each subfield when the tones are displayed on the ascending order from the lowest level (Level 0) to the highest level (Level 191) by the tone display method shown in FIGS. 10(*a*) and 10(*b*). Since b0 to b5 are binary coded, Level 0 to Level 63 emit light in the binary-coding order. When the display reaches Level 64, b6 which is one of the most significant subfields emits light first and the light emission of b6 is continued up to the highest level (Level 191). Next, when the display reaches Level 128, b7 which is another one of the most significant subfields emits light. This light emission is also continued up to the highest level. Each subfield emits light according to a TV image signal under this tone ascending rule.

TABLE 1

| | Bit | | | | | | | |
|---|---|---|---|---|---|---|---|---|
| Level | b0 (1) | b1 (3) | b2 (4) | b3 (8) | b4 (16) | b5 (32) | b6 (64) | b7 (64) |
| 0 | 1 | | | | | | | |
| 1 | | | | | | | | |
| 2 | | 1 | | | | | | |
| 3 | 1 | 1 | | | | | | |
| . | | | | | | | | |
| . | | | | | | | | |
| . | | | | | | | | |
| 63 | 1 | 1 | 1 | 1 | 1 | 1 | | |
| 64 | | | | | | | 1 | |
| 65 | 1 | | | | | | 1 | |
| 66 | | 1 | | | | | 1 | |
| . | | | | | | | . | |
| . | | | | | | | . | |
| . | | | | | | | . | |
| 127 | 1 | 1 | 1 | 1 | 1 | 1 | 1 | |
| 128 | | | | | | | 1 | 1 |
| 129 | 1 | | | | | | 1 | 1 |
| . | | | | | | | . | . |
| . | | | | | | | . | . |
| . | | | | | | | . | . |
| 190 | | 1 | 1 | 1 | 1 | 1 | 1 | |
| 191 | 1 | 1 | 1 | 1 | 1 | 1 | 1 | 1 |

Figure 11A:
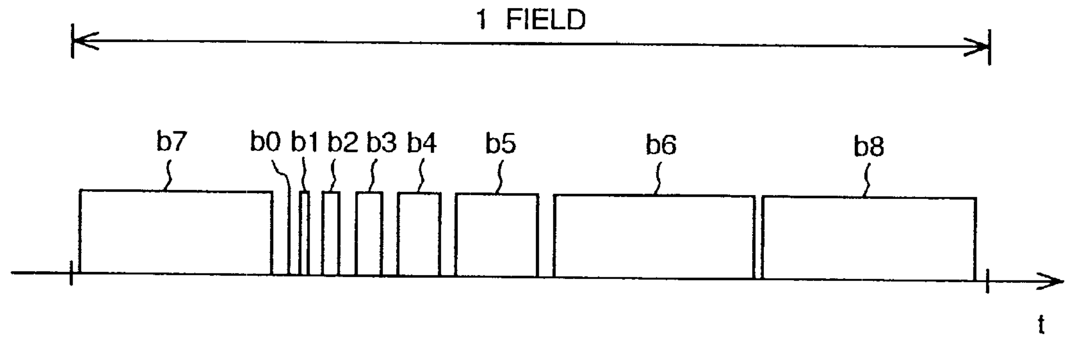
FIGS. 11(*a*) to 11(*c*) are illustrations for another example of the tone display method of the present invention.
Figure 11B:
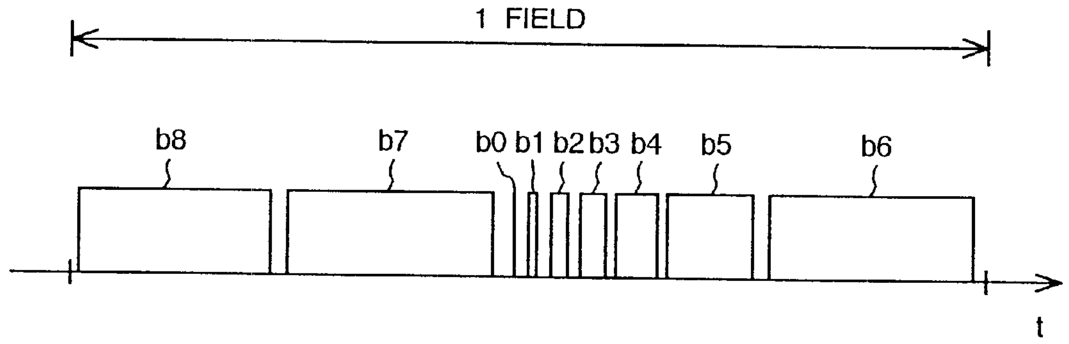
Figure 11C:
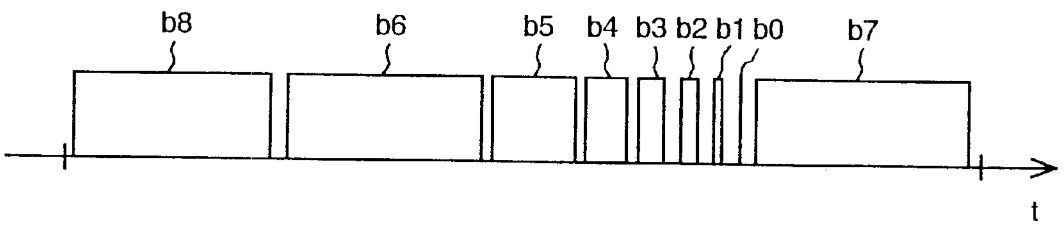

Next, FIG. 11(*a*) shows an arrangement of each subfield in a field when three most significant subfields (named b6, b7, and b8) are provided. One (b7) of the most significant subfields is arranged at the beginning of a field and the two remaining subfields (b6 and b8) are arranged at the end of the field. In FIG. 11(*b*), two ones (b8 and b7) of the most significant subfields are arranged at the beginning of a field and the one remaining subfield (b6) is arranged at the end of the field. FIG. 11(*c*) shows an arrangement of each subfield when the time order of each subfield shown in FIG. 11(*a*) is reversed. The lower subfields (b0 to b5) are arranged between the most significant subfields in the ascending order of luminant time widths (FIGS. 11(*a*) and 11(*b*)) or in the descending order of luminant time widths (FIG. 11(*c*)). The luminant time widths of the subfields b0 to b6 are binary coded and the ratio of luminant time widths of the subfields is b0:b1:b2:b3:b4:b5:b6:b7:b8=1:2:4:8:16:32:64:64:64 and the total number of tones is 256. Table 2 shows the light emission order of each subfield when the tones are displayed on the ascending order from the lowest level (Level 0) to the highest level (Level 255) in FIGS. 11(*a*), 11(*b*), and 11(*c*).

TABLE 2

| | Bit | | | | | | | | |
|---|---|---|---|---|---|---|---|---|---|
| Level | b0 (1) | b1 (3) | b2 (4) | b3 (8) | b4 (16) | b5 (32) | b6 (64) | b7 (64) | b8 (64) |
| 0 | | | | | | | | | |
| 1 | 1 | | | | | | | | |
| 2 | | 1 | | | | | | | |
| 3 | 1 | 1 | | | | | | | |
| . | | | | | | | | | |
| . | | | | | | | | | |
| . | | | | | | | | | |
| 63 | 1 | 1 | 1 | 1 | 1 | | | | |
| 64 | | | | | | | 1 | | |
| 65 | 1 | | | | | | 1 | | |
| . | | | | | | | . | | |
| . | | | | | | | . | | |
| . | | | | | | | . | | |
| 127 | 1 | 1 | 1 | 1 | 1 | 1 | 1 | | |
| 128 | | | | | | | 1 | 1 | |
| 129 | | | | | | | 1 | 1 | |
| . | 1 | | | | | | . | . | |
| . | | | | | | | . | . | |
| . | | | | | | | . | . | |
| 191 | 1 | 1 | 1 | 1 | 1 | 1 | 1 | 1 | |
| 192 | | | | | | | 1 | 1 | 1 |
| 193 | 1 | | | | | | 1 | 1 | 1 |
| . | 1 | | | | | | . | . | . |
| . | | | | | | | . | . | . |
| . | | | | | | | . | . | . |
| 253 | 1 | | 1 | 1 | 1 | 1 | 1 | 1 | 1 |
| 254 | | 1 | 1 | 1 | 1 | 1 | 1 | 1 | 1 |
| 255 | 1 | 1 | 1 | 1 | 1 | 1 | 1 | 1 | 1 |

Level 0 to Level 63 emit light according to the binary coding rule of b0 to b5. When the display reaches Level 64, b6 which is one of the most significant subfields on both sides of the lower subfields emits light and the light emission of b6 is continued up to the highest level (Level 255). Next, when the display reaches Level 128, b7 which is the remaining one of the most significant subfields on both sides of the lower subfields emits light. The light emission of b7 is continued up to Level 255. Next, when the display reaches Level 192, b8 which is the remaining most significant subfield emits light. In the light emission order of these most significant subfields, the light emission on an intermediate level follows the binary coding rule of the lower subfields (b0 to b5).

Figure 12A:
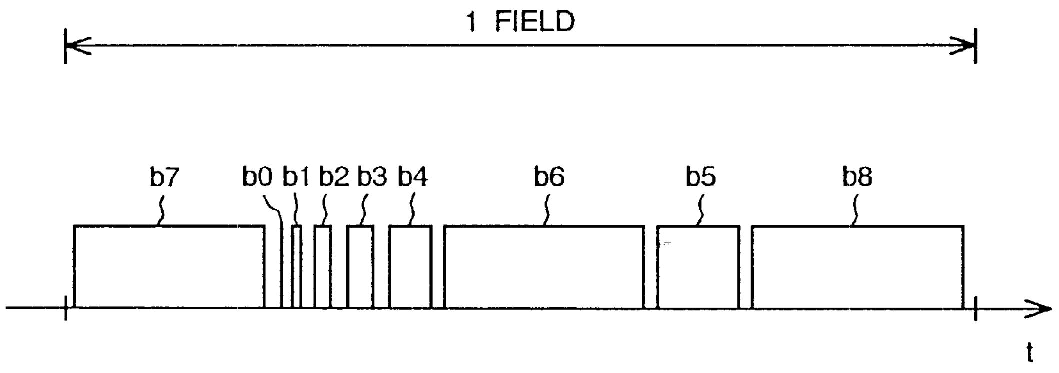
FIGS. 12(*a*) and 12(*b*) are illustrations for another example of the tone display method of the present invention.
Figure 12B:
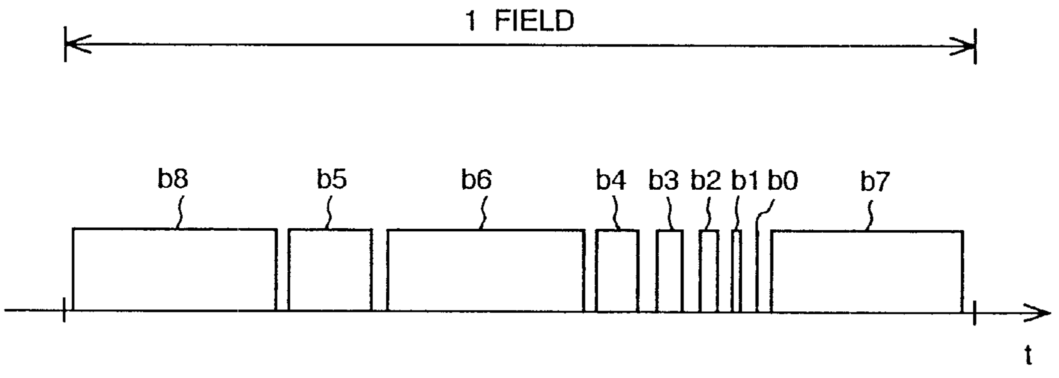

In FIG. 12(*a*), b5 which is one of the lower subfields and b6 which is one of the most significant subfields are interchanged in the order of each subfield shown in FIG. 11(*a*) and in FIG. 12(*b*), the order of each subfield shown in FIG. 12(*a*) is reversed on a time basis. The rule of displaying tones in the ascending order for light emission of Mach subfield shown in FIGS. 12(*a*) and 12(*b*) is the same as that shown in Table 2. By interchanging some of the lower subfields with some of the most significant subfields (although they are b5 and b6 in this embodiment, they are not always one by one) in the order like this, the dynamic false contour noise on a low tone level can be reduced.

Figure 13A:
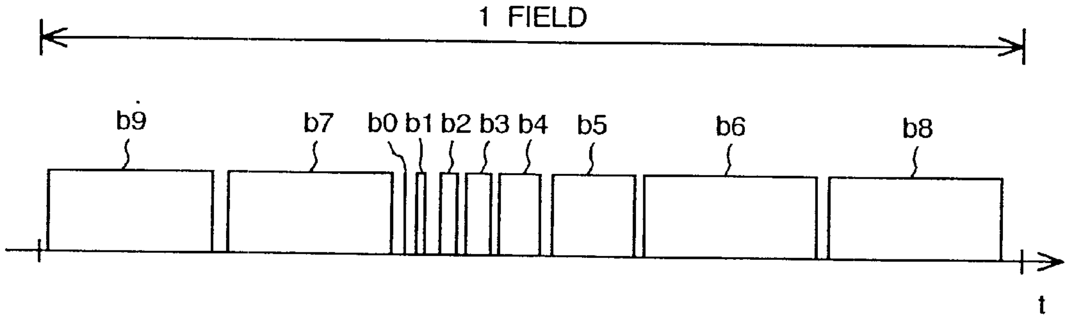
FIGS. 13(*a*) to 13(*c*) are illustrations for another example of the tone display method of the present invention.
Figure 13B:
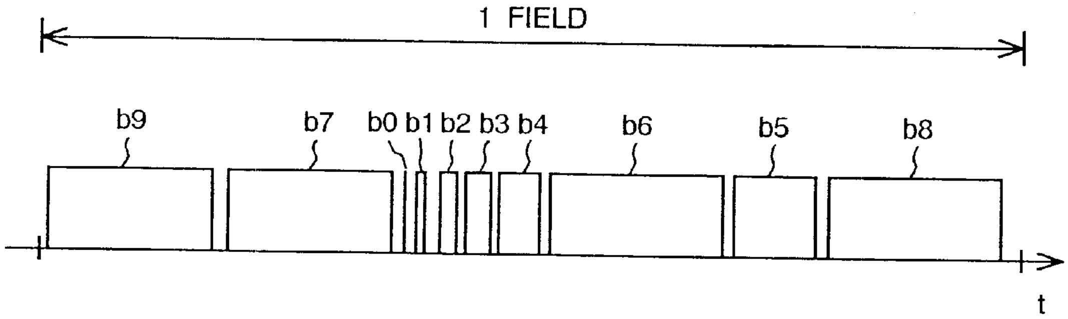
Figure 13C:
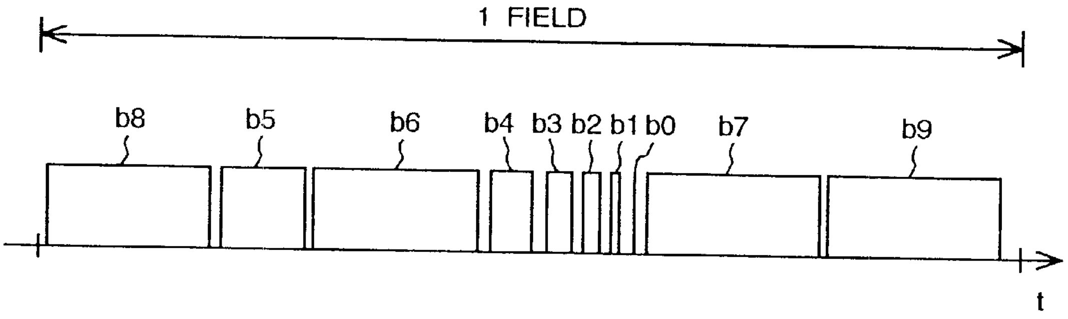

In FIG. 13(*a*), there are four most significant subfields (named b6, b7, b8, and b9) provided, and two most significant subfields are arranged at the beginning of a field and the two remaining most significant subfields are arranged at the end of the field. There are six lower subfields (named b0 to b5) provided and the luminant time widths of the lower subfields are binary coded. The ratio of luminant time widths of the subfields in this one field is b0:b1:b2:b3:b4:b5:b6:b7:b3:b9=1:2:4:8:16:32:48:48:48:48 and the ratio (48) of luminant time widths of the most significant subfields is made smaller than the sum (63) of all the luminant times of the lower subfields. In this case, the number of tones is 256. In FIG. 13(*b*), the arrangement of b5 which is one of the lower subfields and b6 which is one of the most significant subfields is interchanged and by doing this, the dynamic false contour noise on a low tone level can be reduced. In FIG. 13(*c*), the order of each subfield shown in FIG. 13(*b*) is reversed on a time basis. The light emission order in the ascending order of each subfield shown in FIGS. 13(*a*), 13(*b*), and 13(*c*) is shown in Table 3.

TABLE 3

| | Bit | | | | | | | | | |
|---|---|---|---|---|---|---|---|---|---|---|
| Level | b0 (1) | b1 (3) | b2 (4) | b3 (8) | b4 (16) | b5 (32) | b6 (48) | b7 (48) | b8 (48) | b9 (48) |
| 0 | | | | | | | | | | |
| 1 | 1 | | | | | | | | | |
| 2 | | 1 | | | | | | | | |
| 3 | 1 | 1 | | | | | | | | |
| . | | | | | | | | | | |
| . | | | | | | | | | | |
| . | | | | | | | | | | |
| 63 | 1 | 1 | 1 | 1 | 1 | 1 | | | | |
| 64 | | | | | 1 | | 1 | | | |
| 65 | 1 | | | | 1 | | 1 | | | |
| . | | | | | | | . | | | |
| . | | | | | | | . | | | |
| . | | | | | | | . | | | |
| 111 | 1 | 1 | 1 | 1 | 1 | 1 | 1 | | | |
| 112 | | | | | 1 | | 1 | 1 | | |
| 113 | 1 | | | | 1 | | 1 | 1 | | |
| | | | | | | | . | . | | |
| | | | | | | | . | . | | |
| | | | | | | | . | . | | |
| 159 | 1 | 1 | 1 | 1 | 1 | 1 | 1 | 1 | 1 | |
| 160 | | | | | 1 | | 1 | 1 | 1 | |
| 161 | 1 | | | | 1 | | 1 | 1 | 1 | |
| | | | | | | | . | . | . | |
| | | | | | | | . | . | . | |
| | | | | | | | . | . | . | |
| 207 | 1 | 1 | 1 | 1 | 1 | 1 | 1 | 1 | 1 | |
| 208 | | | | | 1 | | 1 | 1 | 1 | 1 |
| 209 | 1 | | | | 1 | | 1 | 1 | 1 | 1 |
| | | | | | | | . | . | . | . |
| | | | | | | | . | . | . | . |
| | | | | | | | . | . | . | . |
| 255 | 1 | 1 | 1 | 1 | 1 | 1 | 1 | 1 | 1 | 1 |

In Table 3, Level 0 to Level 63 emit light according to the binary coding rule of b0 to b5. At Level 64, one (b6) of the most significant subfields on both sides of the lower subfield emits light first and the lower subfield b4 emits light at the same time. b6 which emits light first in the most significant subfields continues the light emission up to the highest level of tone (Level 255). Next, at Level 112, b7 which is the remaining one of the most significant subfields on both sides of the lower subfield starts light emission. The light emission of b7 is continued until the highest level of tone (Level 255) is displayed. Next, at Level 160, the most significant subfield b8 starts light emission and at Level 208, b9 which is the remaining most significant subfield starts light emission.

Figure 14A:
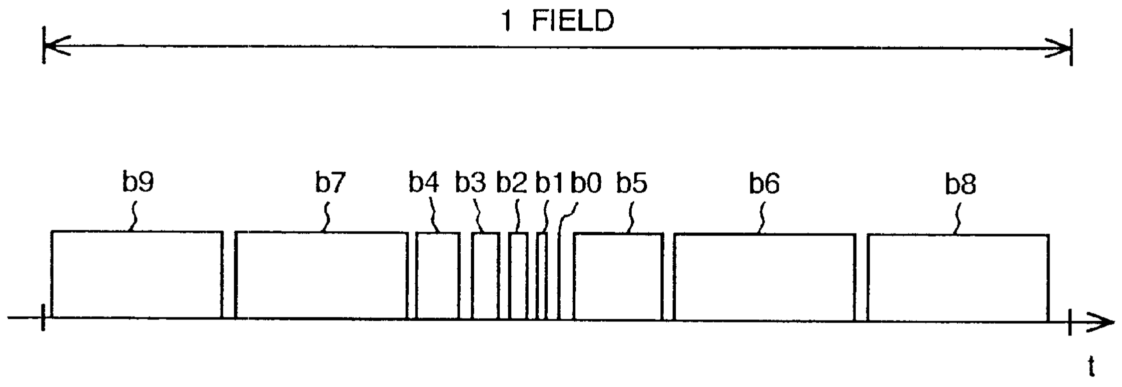
FIGS. 14(*a*) and 14(*b*) are illustrations for another example of the tone display method of the present invention.
Figure 14B:
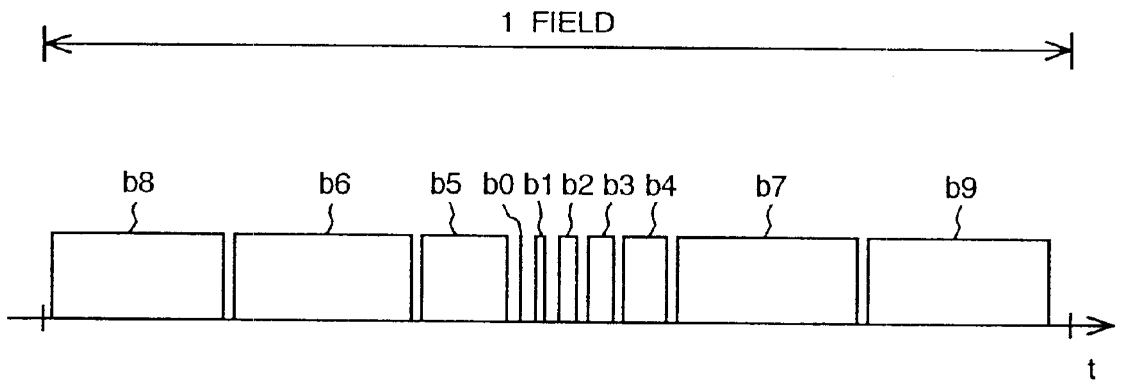

In the aforementioned embodiment, the arrangement order of lower subfields is from the smallest ruminant time width or from the largest luminant time width. However, the characteristic of the present invention is to specify the rules of arrangement and light emission order of most significant subfields but not to control the arrangement order of lower subfields. For example, as shown in FIGS. 14(*a*) and 14(*b*), when two most significant subfields are arranged at the beginning of a field, and the two remaining most significant subfields are arranged at the end of the field, and the order of the lower subfields is set to (b4, b3, b2, b1, b0, b5)=(16, 8, 4, 2, 1, 32) as shown in FIG. 14(*a*), and the time order of the subfields is reversed as shown in FIG. 14(*b*), the dynamic false contour noise can be reduced for a change of light emission of the lower subfields. Therefore, it is clear that optional changing of the order of lower subfields is included in the present invention.

An example of plasma display TV has been described in the embodiment of the present invention. However, the present invention is not limited to those display devices. For example, it is clear that the present invention can be applied to all display devices for executing intra-field time division tone display such as a DMD (digital micromirror device) and light bulb.

Next, the modified embodiments of the tone display method of the present invention will be explained with reference to FIGS. 15–27, 28(*a*)–28(*b*) and 29–33 and Table 4.

Figure 15:
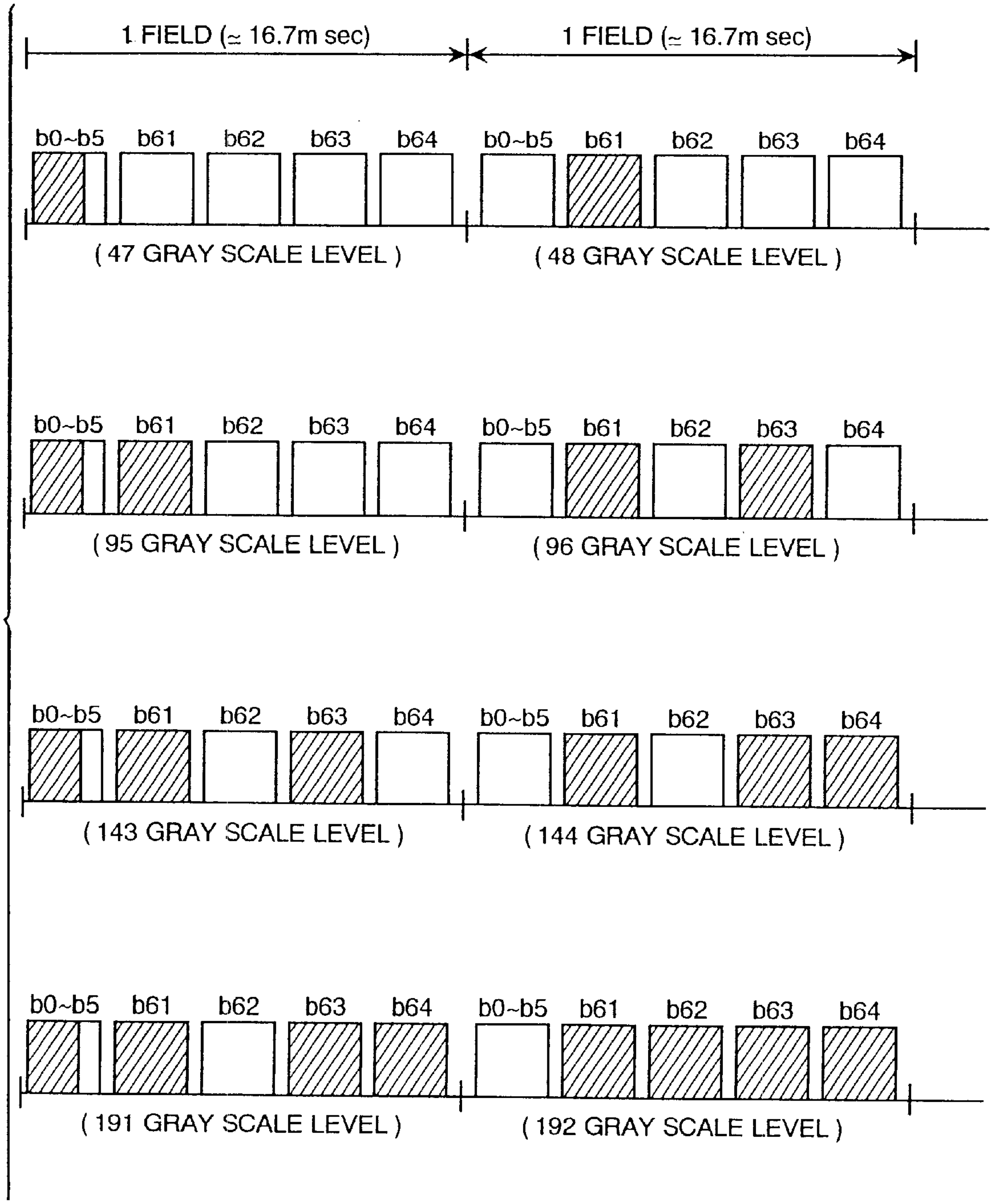
FIG. 15 is a drawing showing a modified embodiment of the tone display method of the present invention.

In FIG. 15, four most significant subfields (b61 to b64) are provided, and the luminant time widths of the lower subfields (b0 to b5) are binary coded, and the lower subfields are arranged at the beginning of a field. The ratio of luminant time widths of b0 to b5 and b61 to b64 is b0:b1:b2:b3:b4:b5:b61:b62:b63:b64=1:2:4:8:16:32:48:48:48:48. In FIG. 15, at the change point of each tone (tone Level 47 and Level 48, Level 95 and Level 96, Level 143 and Level 144, Level 191 and Level 192), the light emission status of the most significant subfield changes. In this case, each hatched part shown in FIG. 15 indicates light emission.

When the tone changes in the ascending order from Level 0 to Level 47, it is expressed by a combination of binary codes of only light emission of the lower subfields. When the tone is on Level 48, b61 which is a most significant subfield neighboring the lower subfield emits light. Next, when the tone is between Level 49 and Level 95, the tone is displayed by a combination of light emission of b61 and light emission of the lower subfields. When the next tone is on Level 96, b61 and b63 among the most significant subfields emit light. The b61 and b63 do not emit light continuously and the light emission disperses in a field. When the tone is between Level 97 and Level 143, the tone is displayed by a combination of light emission of b61 and b63 and light emission of the lower subfields. Next, when the tone becomes Level 144, three of b61, b3, and b64 among the most significant subfields emit light. These three most significant subfields are not continued on a time basis and put b62 which is one of the most significant subfields emitting no light between them. When the tone is between Level 145 and Level 191, the tone is displayed by a combination of light emission of the three most significant subfields b61, b63, and b64 and light emission of the lower subfields. Next, when the tone becomes Level 192, all the four the most significant subfields emit light. When the tone is between Level 193 and Level 255, the tone is displayed by a combination of light emission of all the four most significant subfields and light emission of the lower subfields.

When two or three most significant subfields emit light like this, they do not emit light continuously and the light emission disperses in a field.

Figure 16:
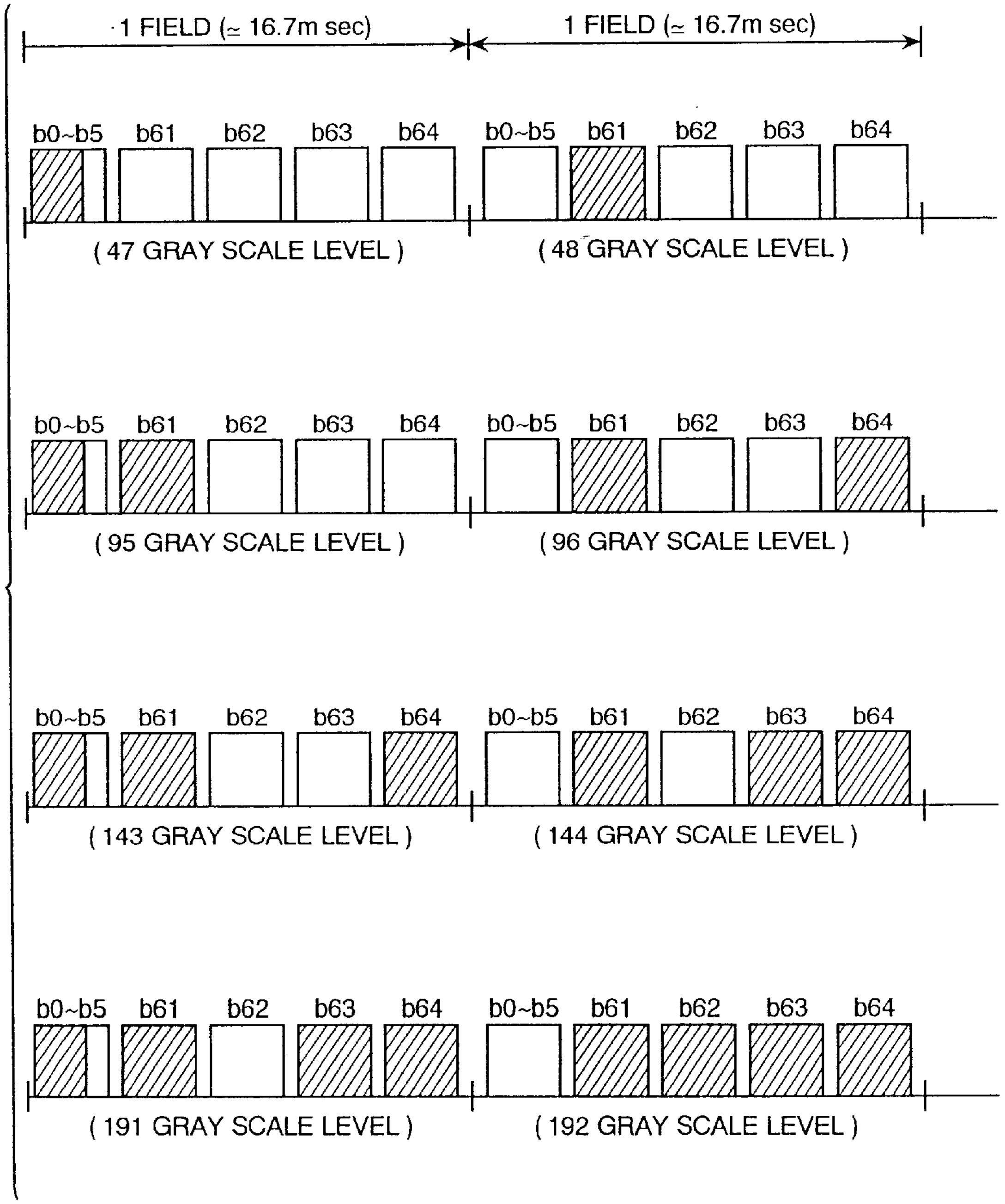
FIG. 16 is a drawing showing another modified embodiment of the tone display method of the present invention.

FIG. 16 shows the light emission status of the most significant subfields which is different from that shown in FIG. 15 when the lower subfields are arranged at the beginning of a field. The different point from FIG. 15 is that b61 and b64 emit light when the tone is on Level 96. Therefore, when the tone is between Level 97 and Level 143, the tone is displayed by a combination of light emission of b61 and b64 and light emission of the lower subfields. When the tone is between Level 144 and Level 255, the method is the same as that shown in FIG. 10.

Figure 17:
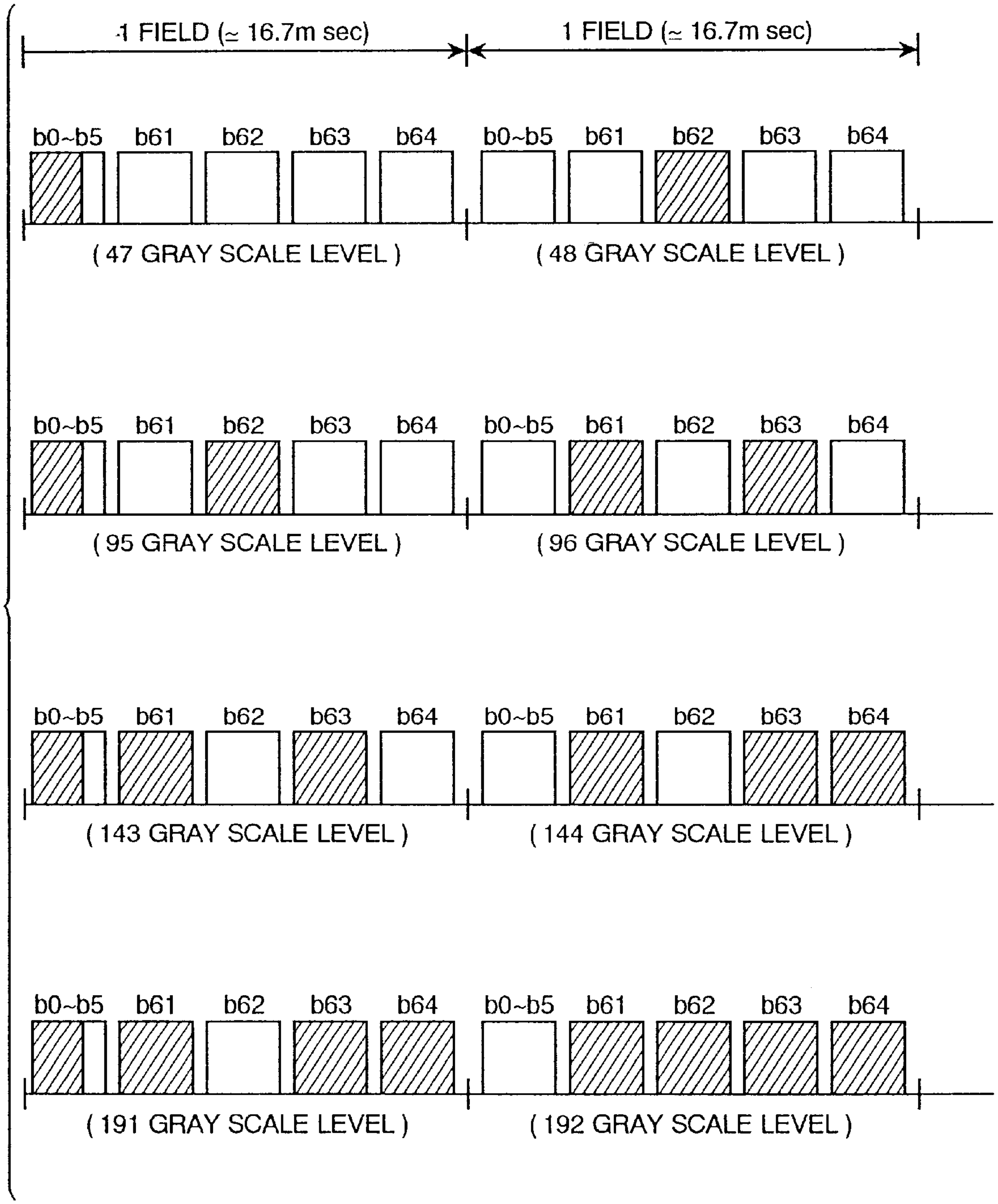
FIG. 17 is a drawing showing another modified embodiment of the tone display method of the present invention.

FIG. 17 shows the light emission status of the most significant subfields which is different from those shown in FIG. 15 and FIG. 16 when the lower subfields are arranged at the beginning of a field. In this case, when the tone is on Level 48, the most significant subfield b62 which is not in the neighborhood of the lower subfields emits light. When the tone is between Level 96 and Level 255, the method is the same as that shown in FIG. 15. In this embodiment, the light emission status changes greatly when the tone is a lower level and disperses most when the tone is higher than the intermediate level.

Figure 18:
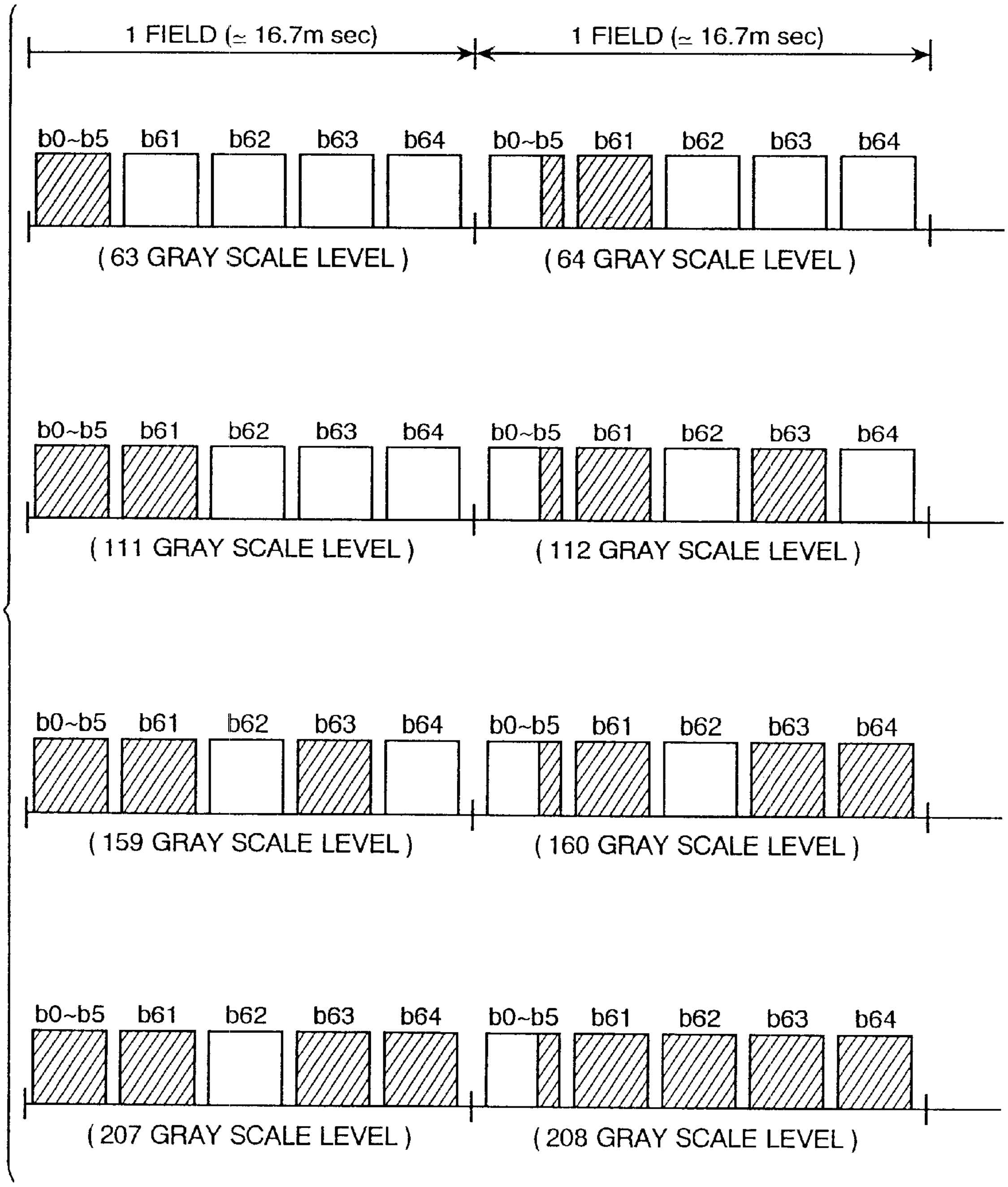
FIG. 18 is a drawing showing another modified embodiment of the tone display method of the present invention.

FIG. 18 shows a case that although the light emission order of the most significant subfields is the same as that shown in FIG. 15, the tone level at the light emission change point of the most significant subfields is different from that shown in FIG. 15. The lower subfields comprise binary codes of b0 to b5, so that the tone can be displayed up to Level 63. Therefore, when the tone reaches Level 64, one (b1) of the most significant subfields and the lower subfield b4 emit light at the same time. In the same way, when the tone reaches Level 112, Level 160, or Level 208, two, three, or four most significant subfields and the lower subfield b4 emit light at the same time.

Figure 19:
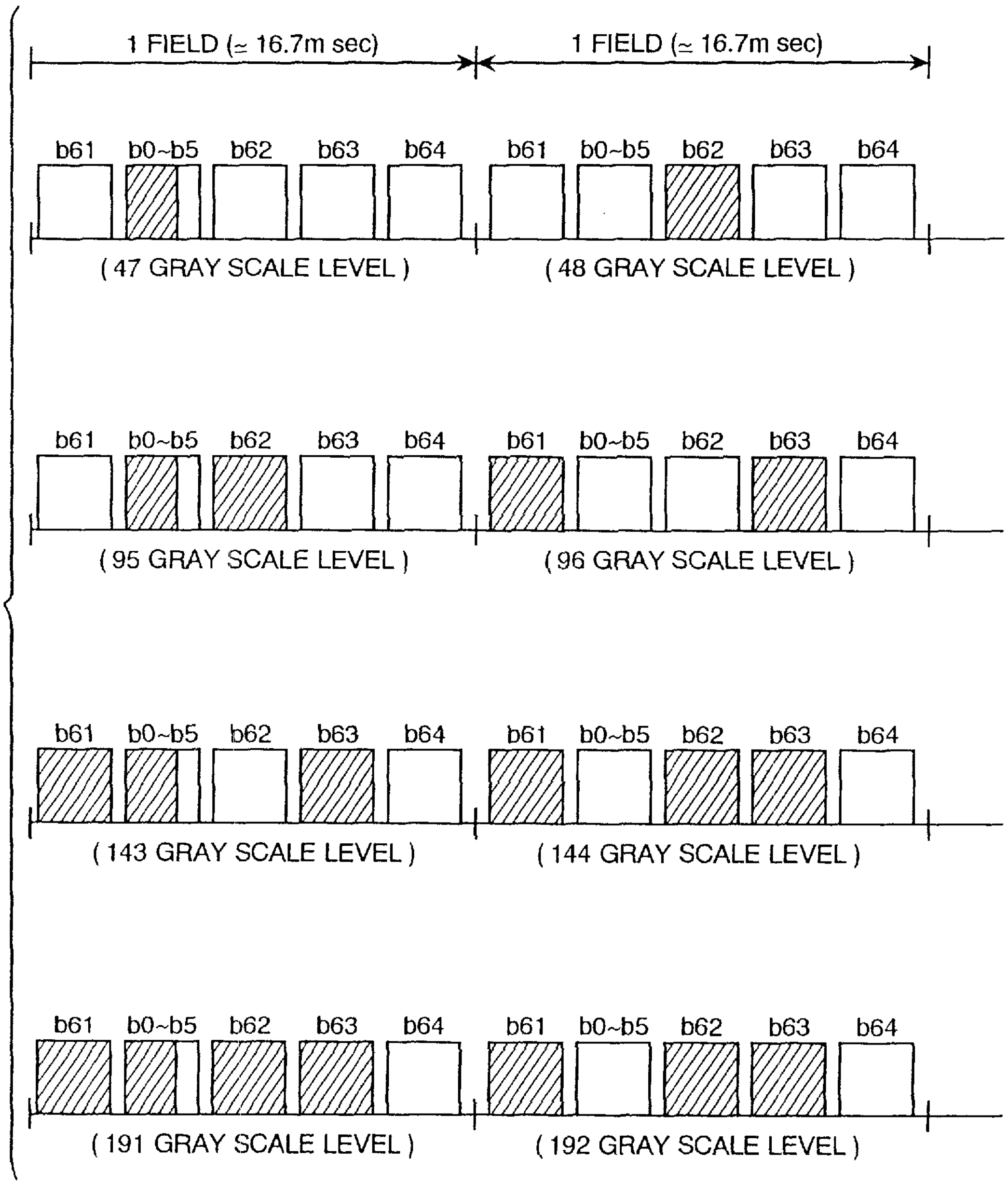
FIG. 19 is a drawing showing another modified embodiment of the tone display method of the present invention.

FIG. 19 shows the light emission status of the most significant subfields when the lower subfields are arranged next to b61 which is one of the most significant subfields in a field. When the tone is on Level 48, b62 emits light. b62 is located almost at the center of the field. When the tone is on Level 96, b61 and b63 emit light and the light emissions of the two most significant subfields are separated greatly from each other. Next, when the tone reaches Level 144, b61, b62, and b63 emit light and the light emissions of the three most significant subfields are not continued. When the tone is on Level 192, all the four most significant subfields emit light. The tone levels of these most significant subfields other than at the change point are displayed by a combination of the lower subfields. In this example, the lower subfields are arranged in the second position in a field, so that the light emission of the most significant subfields can be dispersed considerably.

Figure 20:
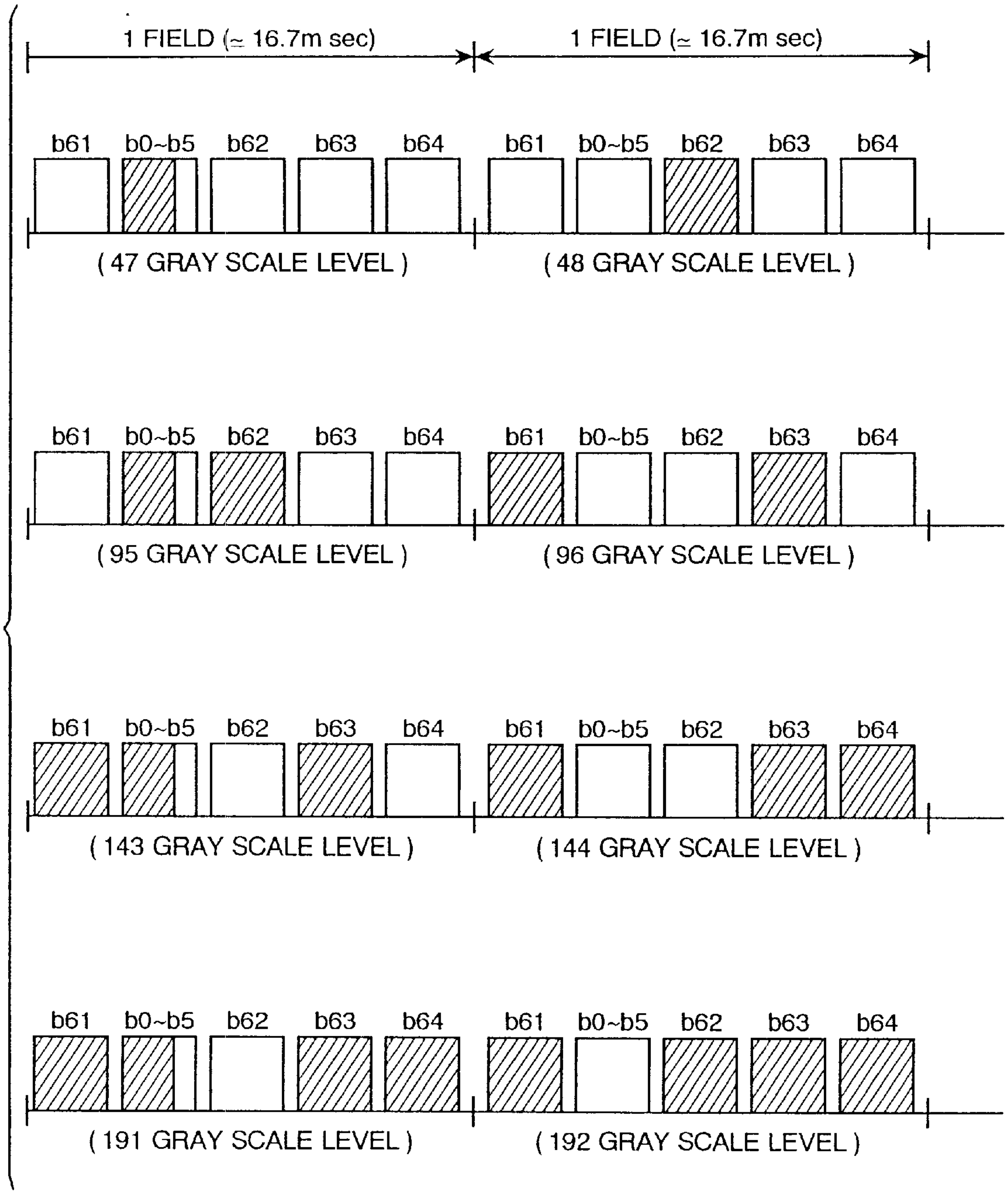
FIG. 20 is a drawing showing another modified embodiment of the tone display method of the present invention.

In FIG. 20, the lower subfields are arranged in the second position in a field in the same way as with FIG. 19 and the light emission status of the most significant subfields is changed. The different point from FIG. 19 is that b61 and b63 emit light when the tone is on Level 144. By doing this, the light emission of the most significant subfields can be dispersed when the tone is on a high level.

Figure 21:
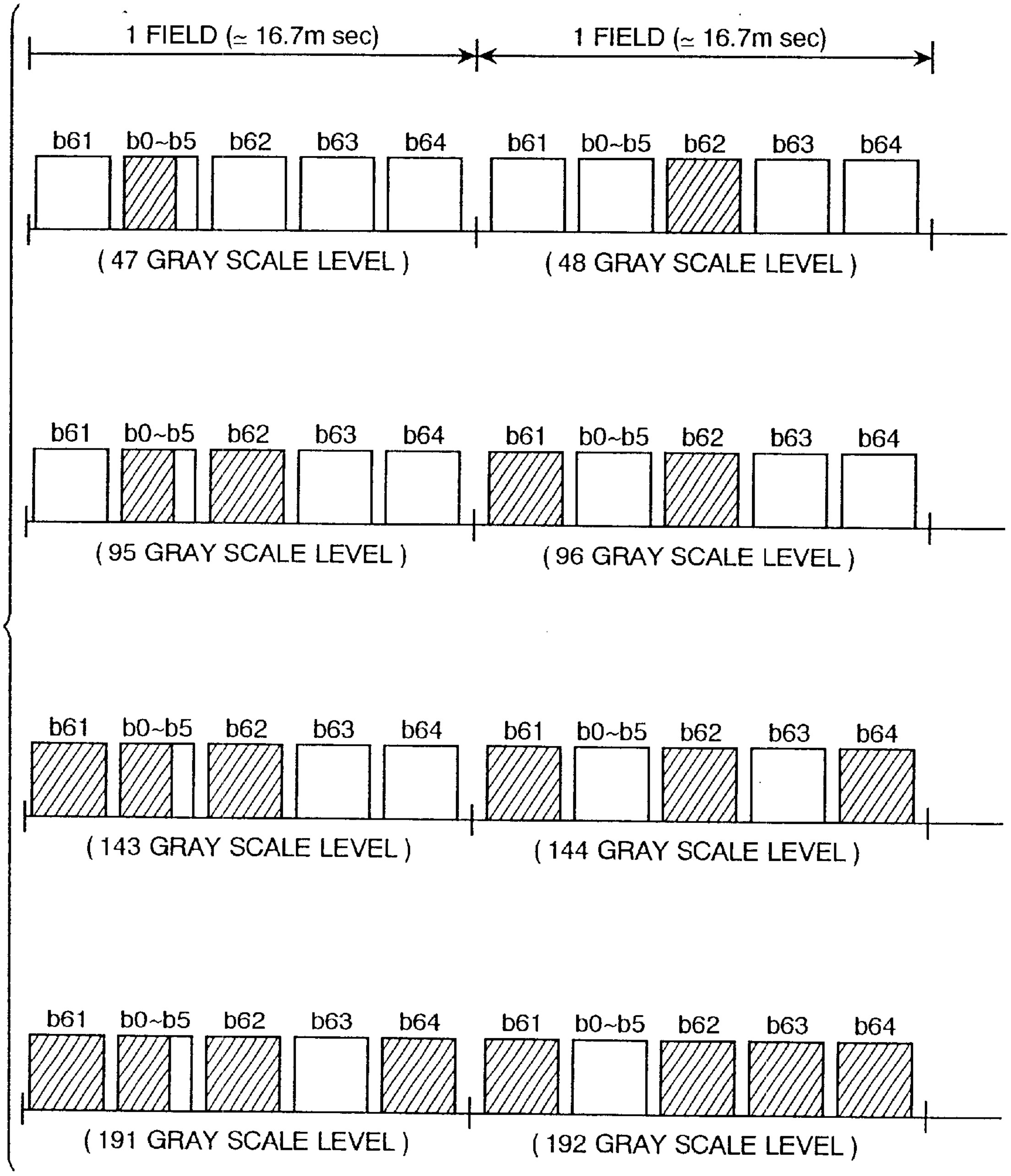
FIG. 21 is a drawing showing another modified embodiment of the tone display method of the present invention.

In FIG. 21, although the lower subfields are arranged in the second position in a field in the same way as with FIGS. 19 and 20, it is a different point that b61 and b61 among the most significant subfields emit light when the tone is on Level 96. When such a light emission order is used, the light emissions of the most significant subfields b61, b62, and b64 are dispersed most when the tone is on Level 144. Therefore, in this example, the dynamic false contour noise can be reduced most at the intermediate tone level.

Figure 22:
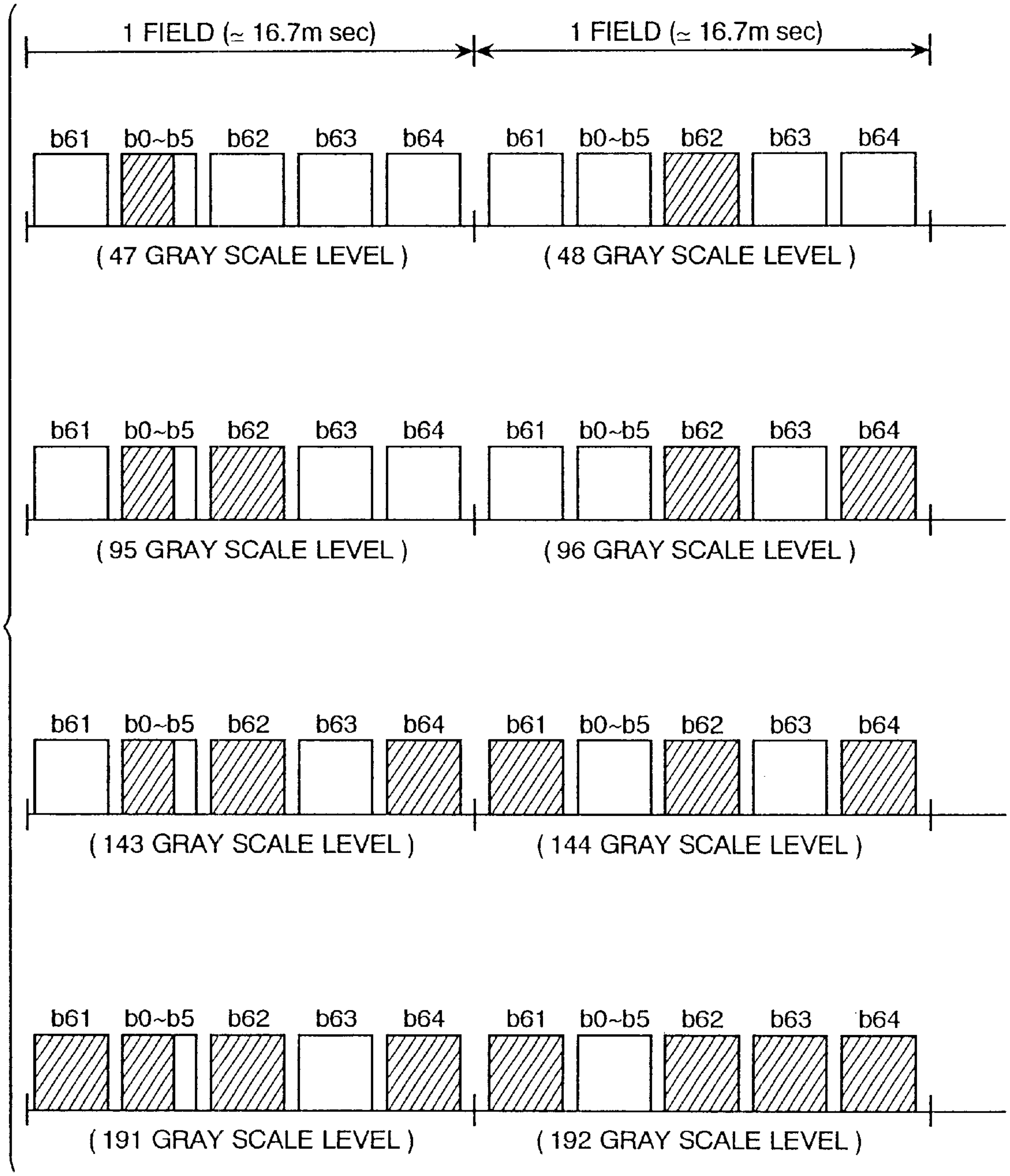
FIG. 22 is a drawing showing another modified embodiment of the tone display method of the present invention.

FIG. 22 shows a case that b62 and b64 emit light when the tone is on Level 96 slightly unlike the method shown in FIG.

21. In this example, the portion which does not emit light continuously when the tone changes from Level 95 to Level 96 occupies about ⅘ of the period in a field, so that dynamic false contour noise is easily generated.

Figure 23:
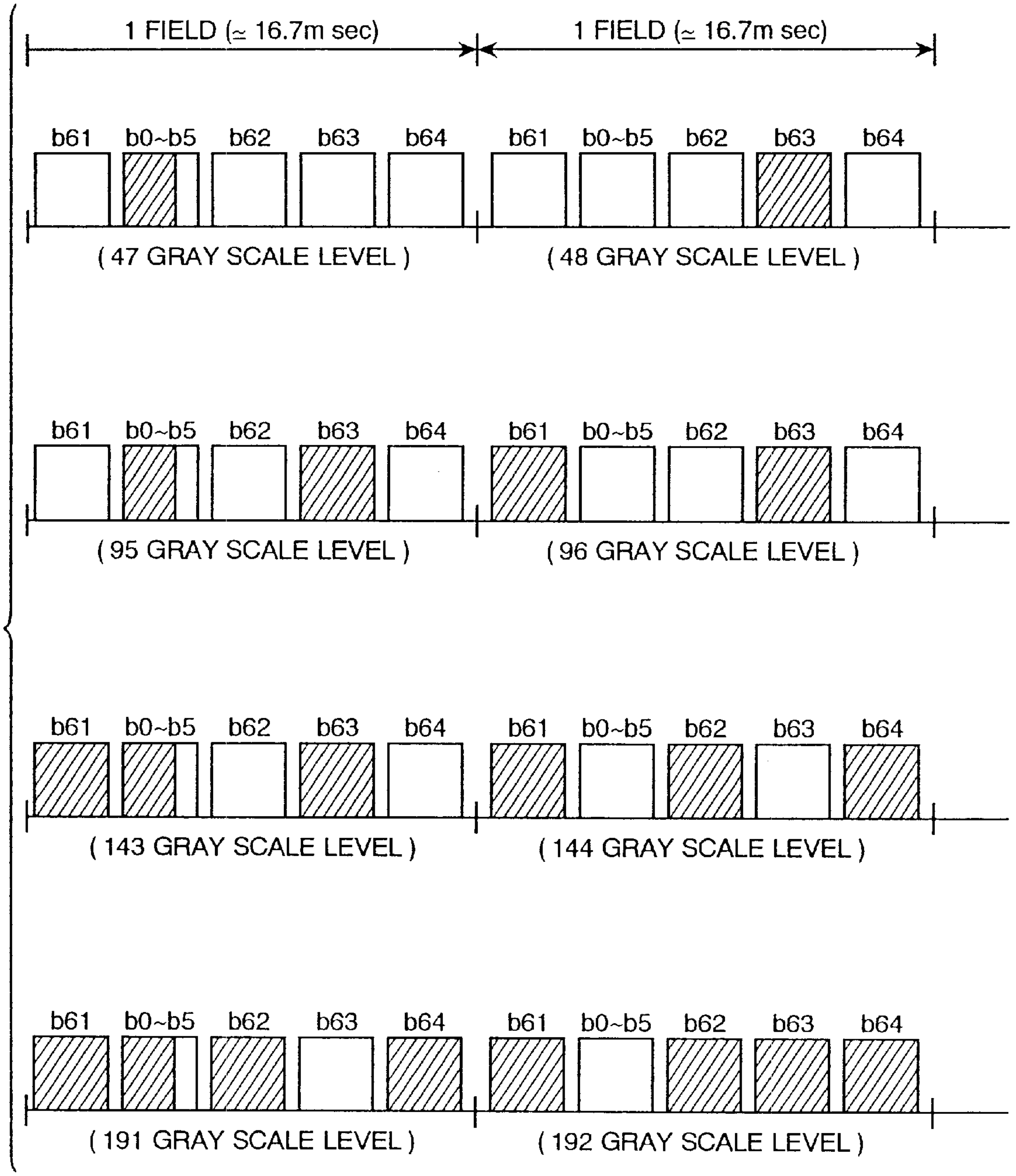
FIG. 23 is a drawing showing another modified embodiment of the tone display method of the present invention.

In FIG. 23, unlike the methods shown in FIGS. 19 to 22, b63 which is not one of the most significant subfields on both sides of the lower subfield emits light when the tone is on Level 48. In this example, there is a long period of gap of light emission when the tone is on a low level, so that dynamic false contour noise is generated when the tone is on a low level. However, since the light emissions of the most significant subfields disperse when the tone is between the intermediate level and the highest level, little dynamic false contour noise is generated in this tone region.

Figure 24:
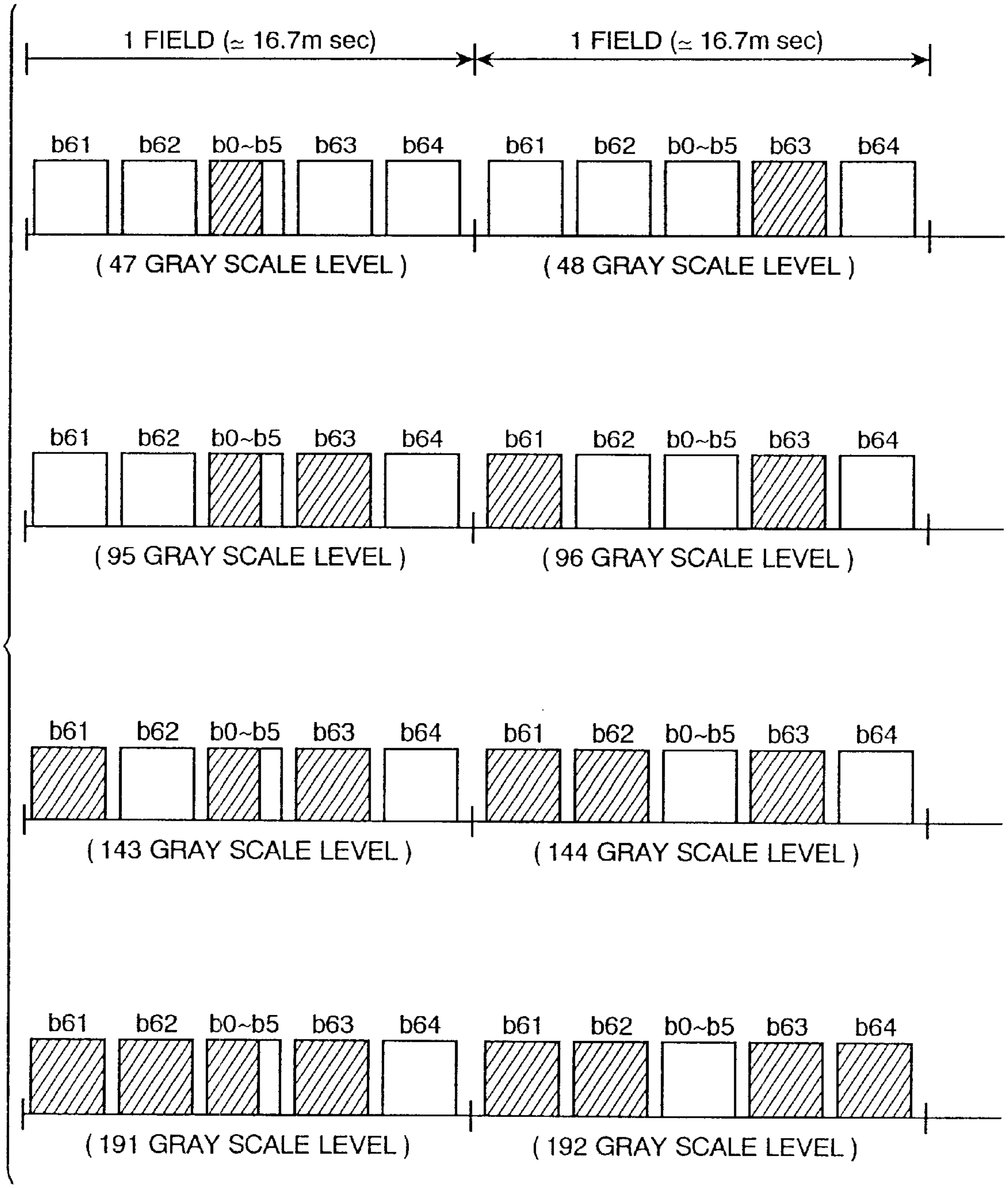
FIG. 24 is a drawing showing another modified embodiment of the tone display method of the present invention.

FIG. 24 shows the light emission status of the most significant subfields when the lower subfields are positioned next to b61 and b62 which are two of the most significant subfields in a field. When the tone is on Level 48, b63 which is one of the most significant subfields and in the neighborhood of the lower subfield emits light. Next, when the tone reaches Level 96, the most significant subfield b61 which is positioned at the beginning of a field and the most significant subfield b63 which is positioned in the latter half of the field emit light. Next, when the tone reaches Level 144, the three most significant subfields b61, b62, and b63 emit light and since these three most significant subfields are put between the lower subfields, the light emission is not continued. Next, when the tone reaches Level 192, all the most significant subfields b61, b62, b63, and b64 emit light.

Figure 25:
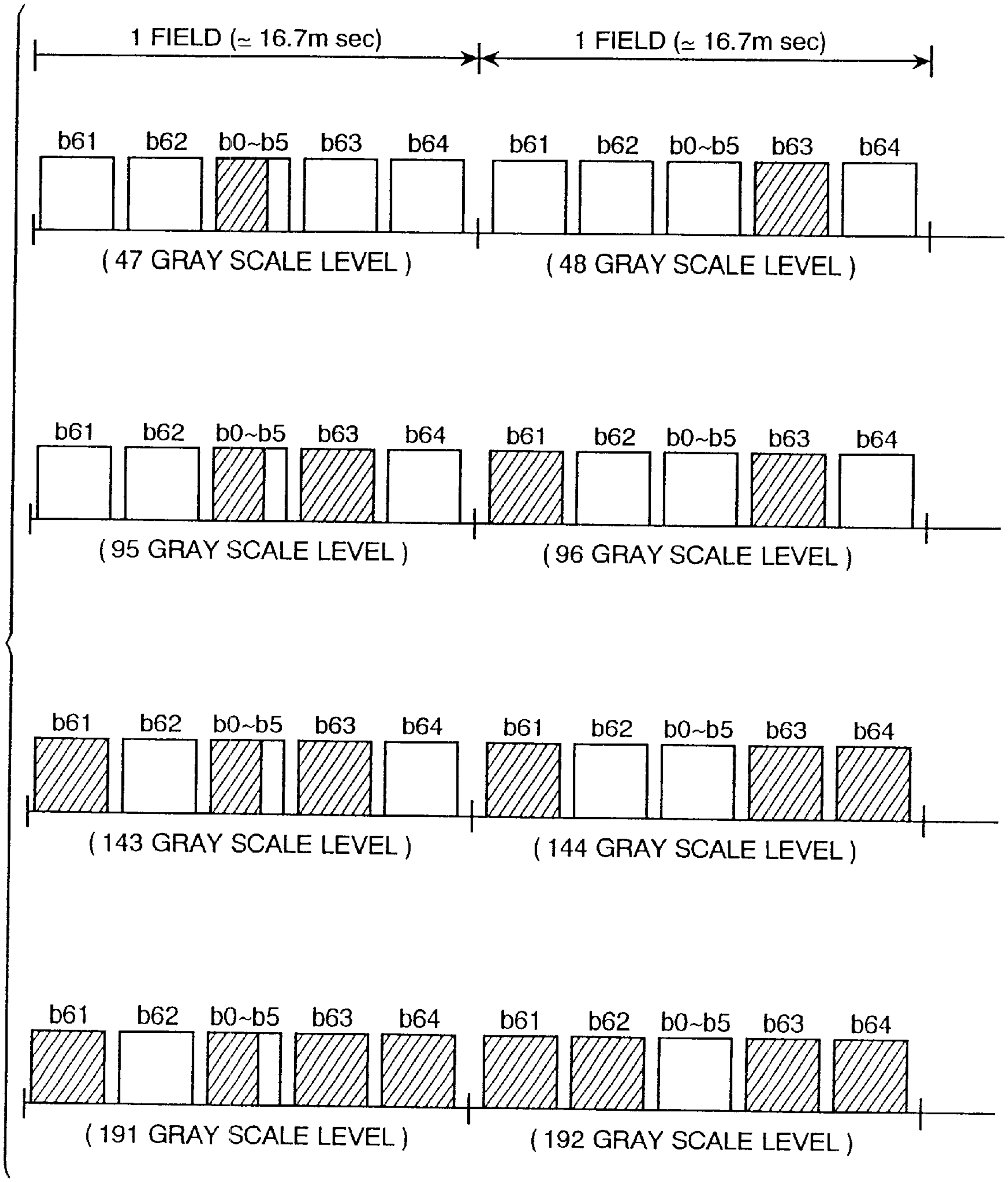
FIG. 25 is a drawing showing another modified embodiment of the tone display method of the present invention.

FIG. 25 shows another example of the light emission status of the most significant subfields when the lower subfields are positioned in the middle of a field in the same way as with FIG. 24. The different point from FIG. 24 is that b61, b63, and b64 emit light when the tone is on Level 144.

Figure 26:
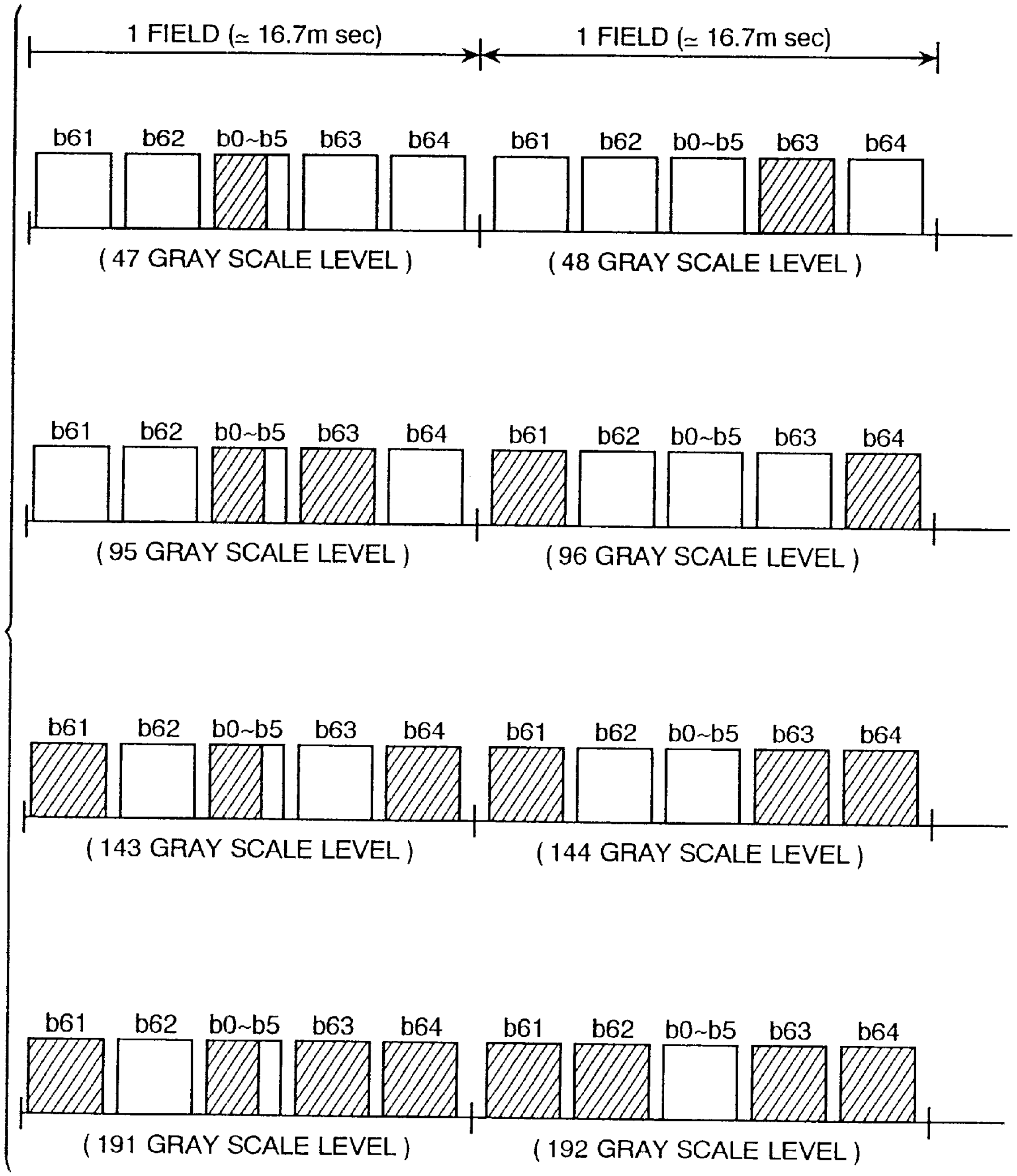
FIG. 26 is a drawing showing another modified embodiment of the tone display method of the present invention.

FIG. 26 shows another example of the light emission status of the most significant subfields when the lower subfields are positioned in the middle of a field in the same way as with FIG. 24. The different point from FIGS. 24 and 25 is that both ends of b61 and b64 in a field emit light when the tone is on Level 96.

Figure 27:
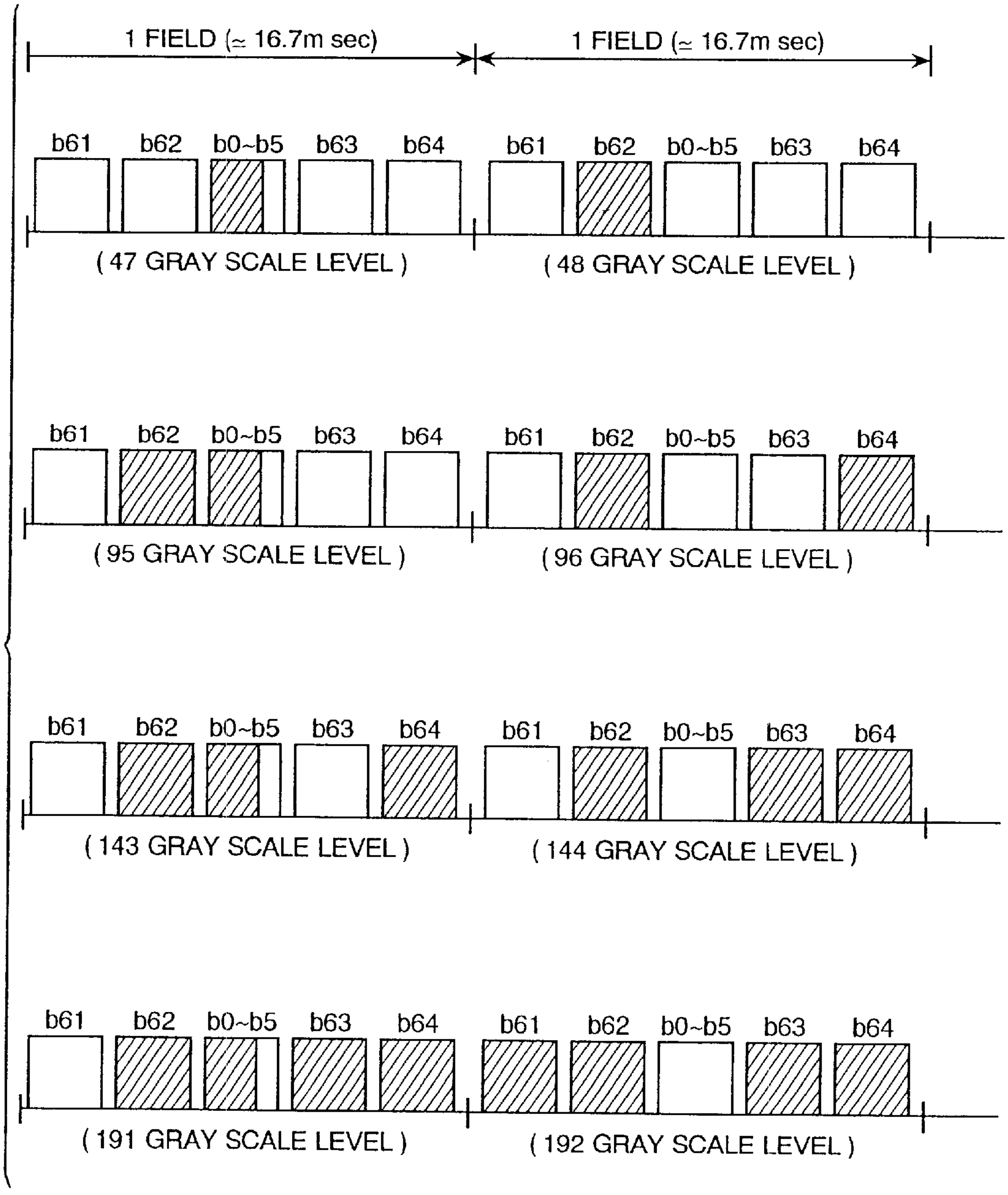
FIG. 27 is a drawing showing another modified embodiment of the tone display method of the present invention.

FIG. 27 shows another example of the light emission status of the most significant subfields when the lower subfields are positioned in the middle of a field in the same way as with FIG. 24. In this case, when the tone is on Level 48, b62 which is earlier on a time basis than the lower subfields emits light and when the tone reaches Level 96, b62 and b64 emit light. When the tone is on Level 144, b62, b63, and b64 emit light.

The status of the light emission change point of the most significant subfields is described above by referring to FIGS. 15 to 27. In all these examples, there is a rule available that when two most significant subfields emit light, the light emissions are always separated from each other and when three most significant subfields emit light, the light emissions are not continued. Therefore, it is clear that if this rule is available in a case other than these examples, it is included in the present invention.

The light emission change point of the most significant subfields is described when the tone is mainly on Level 48, Level 96, Level 144, and Level 192. However, as described later, if the tone display range of the lower subfields is changed, the tone level at the light emission change point of the most significant subfields can be changed, so that the present invention is not limited to these tone levels.

Three examples that the lower subfields are positioned at the beginning, second position, and third position in a field are described above. However, when the lower subfields are positioned at the fourth position and end in the field, it is desirable that the aforementioned examples are reversed on a time basis. Therefore, it is clear that those cases are included in the present invention.

Figure 28A:
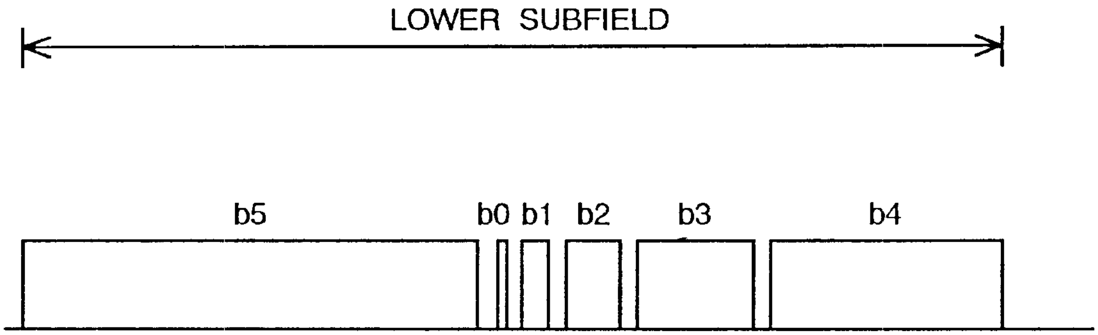
FIGS. 28(*a*) and 28(*b*) are drawings showing embodiments of the time order of a lower subfield of the present invention.
Figure 28B:
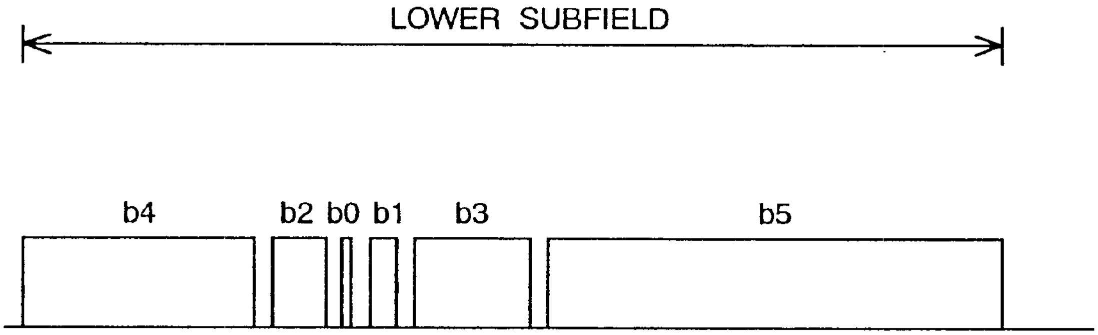

FIGS. 28(*a*) and 28(*b*) show examples of arrangement of each subfield in the lower subfields. The lower subfields comprise six subfields of b0 to b5 and the luminant time width of each subfield is binary coded. The arrangement of the lower subfields shown in FIG. 28(*a*) is in the order of b5, b0, b1, b2, b3, and b4. The order of the lower subfields shown in FIG. 28(*b*) is b4, b2, b0, b1, b3, and b5. These examples have a rule that two subfields having a widest luminant time width respectively among the lower subfields are arranged at both ends of the line of the lower subfields. When the lower subfields are arranged like this, the subfields emitting light can be dispersed in the tone ascending order of the lower subfields.

Next, an embodiment when the light emission change point of the most significant subfields is changed by a pixel, line, or field of a display device will be described by referring to Table 4.

TABLE 4

| | Display I | | | | | | | Display II | | | | | | |
|---|---|---|---|---|---|---|---|---|---|---|---|---|---|---|
| Level | b0 | b1 | b2 | b3 | b4 | b5 | b61 | b0 | b1 | b2 | b3 | b4 | b5 | b61 |
| 47 | 1 | 1 | 1 | 1 | | 1 | | 1 | 1 | 1 | 1 | | 1 | |
| 48 | | | | | 1 | 1 | | | | | | | | 1 |
| 49 | 1 | | | | 1 | 1 | | 1 | | | | | | 1 |
| 50 | | 1 | | | 1 | 1 | | | 1 | | | | | 1 |
| 51 | 1 | 1 | | | 1 | 1 | | 1 | 1 | | | | | 1 |
| 52 | | | 1 | | 1 | 1 | | | | 1 | | | | 1 |
| 53 | 1 | | 1 | | 1 | 1 | | 1 | | 1 | | | | 1 |
| 54 | | 1 | 1 | | 1 | 1 | | | 1 | 1 | | | | 1 |
| 55 | 1 | 1 | 1 | | 1 | 1 | | 1 | 1 | 1 | | | | 1 |
| 56 | | | 1 | 1 | 1 | | | | | | 1 | | | 1 |
| 57 | 1 | | | 1 | 1 | 1 | | 1 | | | 1 | | | 1 |
| 58 | | 1 | | 1 | 1 | 1 | | | 1 | | 1 | | | 1 |
| 59 | 1 | 1 | | 1 | 1 | 1 | | 1 | 1 | | 1 | | | 1 |
| 60 | | | 1 | 1 | 1 | 1 | | | | 1 | 1 | | | 1 |
| 61 | 1 | | 1 | 1 | 1 | 1 | | 1 | | 1 | 1 | | | 1 |
| 62 | | 1 | 1 | 1 | 1 | 1 | | | 1 | 1 | 1 | | | 1 |

TABLE 4-continued

| | Display I | | | | | | | Display II | | | | | | |
|---|---|---|---|---|---|---|---|---|---|---|---|---|---|---|
| Level | b0 | b1 | b2 | b3 | b4 | b5 | b61 | b0 | b1 | b2 | b3 | b4 | b5 | b61 |
| 63 | 1 | 1 | 1 | 1 | 1 | 1 | | 1 | 1 | 1 | 1 | | | 1 |
| 64 | | | | | 1 | | 1 | | | | | 1 | | 1 |

The luminant time widths of the lower subfields b0 to b5 are binary coded and the tone levels which can be displayed are Level 0 to Level 63. On the other hand, the ratio of luminant time widths of one of the most significant subfields is 48. Therefore, as shown in Table 4, when the tone is between Level 48 and Level 64, there are two display methods available. The Display I method shown in Table 4 displays the tone between Level 48 and Level 63 only by the lower subfields and the Display II method displays the tone by making one of the most significant subfields emit light and combining it with the lower subfields. Therefore, Display I can be moved to Display II in the tone ascending order at an optional tone level between the tone Level 48 and Level 63.

On the other hand, it is known that dynamic false contour noise appears remarkably at a tone level where the light emission of the most significant subfields changes. This dynamic false contour noise appears at a certain specific tone level in a portion where the tone of a TV image changes smoothly (a level at which the light emission of the most significant subfields changes) and is concentrated in a limited portion of an image, so that it is conspicuous to an observer.

Therefore, according to the present invention, the tone levels at which the light emission of the most significant subfields changes are dispersed in a wide region of an image at random so that the change is not conspicuous to an observer. For that purpose, the tone levels at which the light emission of the most significant subfields at neighboring pixels or lines of a display device changes are made different from each other. This dynamic false contour noise is generated during a period of time sufficient for a person to perceive which is followed by movement of the viewing point of an observer. Therefore, by changing the tone level at which the light emission of the most significant subfields changes for each field of a TV signal, dynamic false contour noise can be generated only for a very short period of time so that it is not perceived by an observer.

The above example and Table 4 are described between the tone Level 48 and Level 63. However, the same matter can be applied to a case that two, three, or four most significant subfield emits light. The tone level is between Level 96 and Level 111, between Level 144 and Level 159, or between Level 192 and Level 207. Within these tone ranges, the tone level at which the light emission of the most significant subfields changes at a pixel, or line, or field, or both of them of a display device is changed at random.

Figure 29:
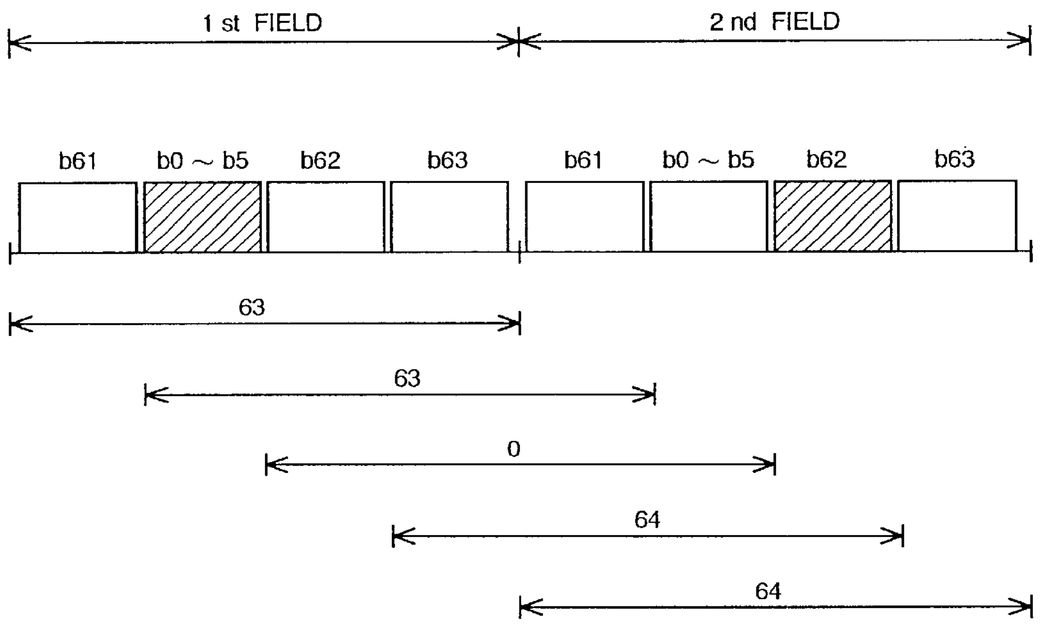
FIG. 29 is an illustration for the tone control method of the present invention.

FIG. 29 is a drawing showing an example of how to emit light by lower subfields so that the integral value of light emission in the time zone over a field becomes constant most. As shown in FIG. 29, it is assumed that the lower subfields have binary-coded luminant time widths of b0 to b5, and three most significant subfields (b61, b62, b63) are provided, and the ratio of luminant time widths is 64. It is assumed that the lower subfields are arranged in the second position in a field, and the tone level in the first field is Level 63 and the tone level in the second field is slightly changed from the tone level in the first field to Level 64. In this case, all the lower subfields emit light in the first field and b62 emits light in the second field. When the time zone over a field is shifted little by little as shown in FIG. 29 and the ratios of integral values of luminant time in the time zone are obtained, they are 63, 63, 0, 64, and 64. In this example, although there is a location where the integral value of luminant time becomes 0, the integral values in the other portions are almost constant.

Figure 30:
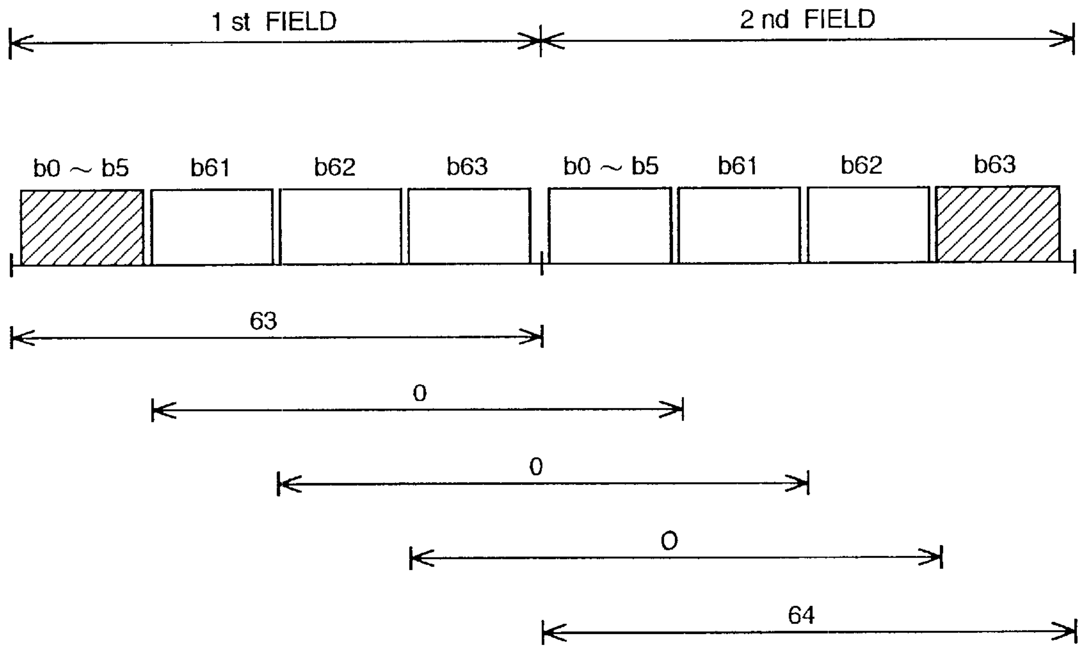
FIG. 30 is a drawing showing a bad example of tone control.

However, as shown in FIG. 30, if the lower subfields are arranged at the beginning of a field, and the tone levels which are the same as those shown in FIG. 29 are displayed, and b63 emits light in the second field, when the time zone is shifted, the ratios of integral values of luminant time in the time zone over a field become 63, 0, 0, 0, and 64 and three portions of 0 are continued. In this example, the integral values of luminant time over a field are changed greatly. In this case, dynamic false contour noise appears remarkably.

Figure 31:
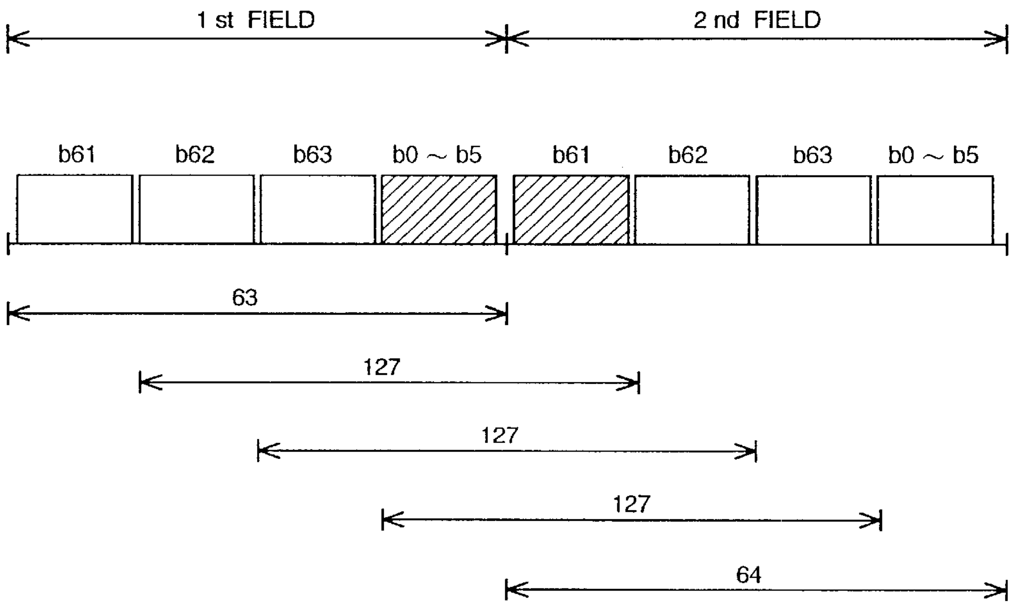
FIG. 31 is another drawing showing a bad example of tone control.

Furthermore, as shown in FIG. 31, if the lower subfields are arranged at the end of a field, and the tone levels which are the same as those shown in FIG. 29 are displayed, and b61 emits light in the second field, when the time zone is shifted, the ratios of integral values of luminant time in the time zone over a field become 63, 127, 127, 127, and 64. Also in this case, the integral values of luminant time over a field are changed greatly and dynamic false contour noise is generated remarkably.

As shown in FIGS. 29 to 31, by controlling the light emission of each subfield so that the integral values of luminant time over a field become constant most and become almost equal to the tone levels to be displayed originally, the dynamic false contour noise can be reduced.

Figure 32:
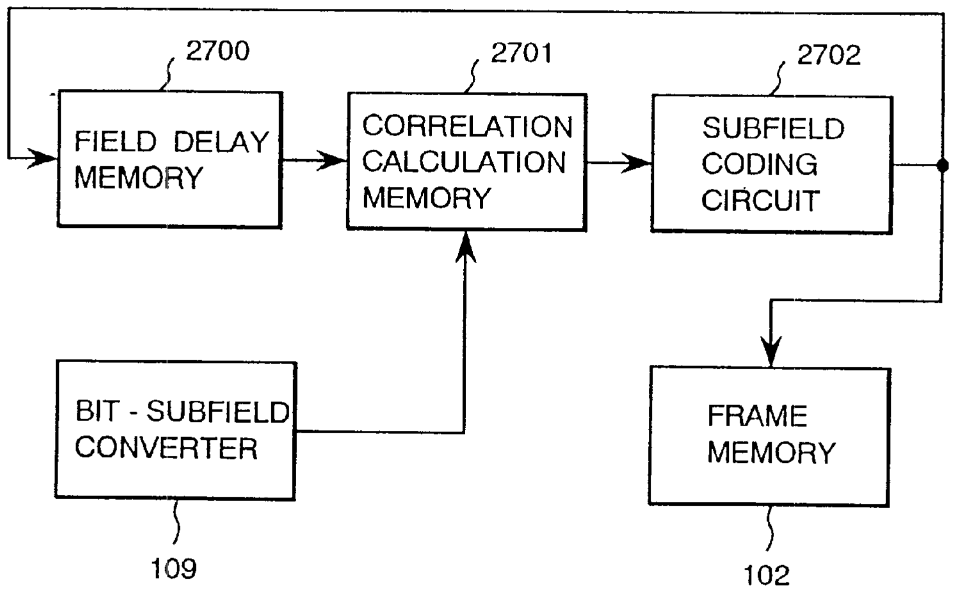
FIG. 32 is a circuit block diagram for executing tone control of the present invention.

FIG. 32 is a signal processing block diagram showing a method for obtaining the correlation between a pattern of subfields emitting light in a field before a light emitting pixel and a pattern of subfields emitting light in the next field and controlling the subfields emitting light in the next field so as to maximize the correlation.

The correlation of the light emission pattern of each subfield outputted from the bit-subfield converter 109 and the light emission pattern of each subfield in a field before outputted from a one-field delay memory 2700 is obtained. Next, the light emission pattern of subfields where the correlation is maximized is obtained by a correlation calculation memory 2701. The output signal thereof is converted to a light emission code of subfields by a subfield coding circuit 2702 and then stored in the frame memory 102. The constitution of these circuits is inserted between the bit-subfield converter 109 and the frame memory 102 shown in FIG. 1.

Next, a method for obtaining the correlation of pixel appearances followed by movement of the viewing point of an observer and deciding subfields emitting light in the next field so as to maximize the correlation will be explained.

The luminant time function of a pixel in a field is taken as f(t). If the viewing point moves at a velocity of v at that time, a spatial function g(x) of the pixel appearance is given by:

$$g(x)=vf(t)$$

Assuming that the luminant time function in the next field is changed to f' (t), a spatial function g' (x) of the pixel appearance at that time is given by:

$$g'(x)=vf'(t)$$

Assuming a correlative function of the pixel appearance as P, P is given by:

$$P=\int|g(x)-g'(x)|dx=v^2\int|f(t)-f'(t)|dt$$

Figure 33:
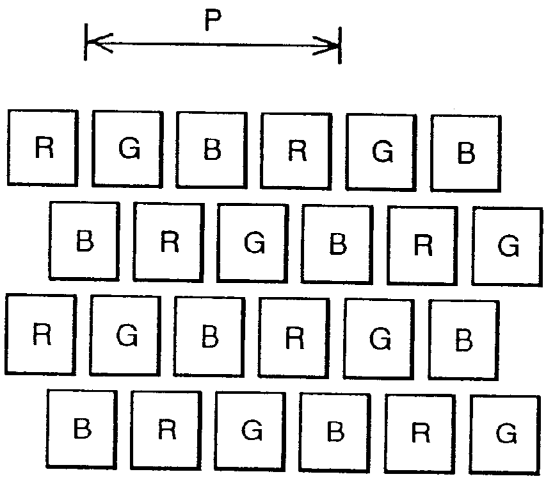
FIG. 33 is a drawing showing an example of pixel arrangement of a display device.

Therefore, the correlation of pixel appearance when the viewing point moves is the same as the correlation with the luminant time pattern in the next field except the coefficient. In this case, it is assumed that the pixel arrangement is a digital arrangement with a pitch of p as shown in FIG. 33. In this case, the pixel appearance when the viewing point moves is different between even lines and odd lines. If there is a great correlation in the pixel appearance between pixels on even lines and pixels on odd lines, dynamic false contour noise become hard to see. In such a case, it is desirable that a pixel emitting light when the viewing point moves is seen as shifted by a half of the pixel pitch p. Assuming g(x) as a pixel appearance on even lines and h(x) as a pixel appearance on odd lines, they are expressed as follows:

$$h(x)=g(x-p/2)$$

If the luminant time function of pixels on even lines in the next field is taken as f' (t), the correlation Ph of light emitting pixel appearance on the adjacent line when the viewing point moves is expressed as follows:

$$Ph=\int|h(x)-g'(x)|dx==\int|g(x-p/2)-g'(x)\equiv dx=\int|f(t-p/2v)-f'(t)|dt$$

and f' (t) minimizing this correlative function Ph is made the luminant time function in the next field. For that purpose, it is desirable that at least three most significant subfields are provided in d field and the position of a most significant subfield emitting light is decided so as minimize this correlative function Ph.

Next, a light emission control method of subfields for maximizing the sum of all correlations of light emission patterns when the tone is changed in the ascending order from the lowest tone level to the highest level will be explained.

The luminant time function in a field when the tone is on Level k is taken as fk(t). Assuming the correlative function when the tone is on Level k and Level k+1 as Pk, it is expressed as follows:

$$Pk=\int|(t)-fk+1(t)|dt$$

Therefore, assuming the sum of correlative functions of all the tones in the ascending order as P, it is expressed as follows:

$$P=\Sigma P_K$$

In this case, the symbol of sum indicates the number from k=0 to K=254. It is desirable that at least three most significant subfields emitting light are selected from fk(t) so as to minimize the summed correlative function P.

Next, the correlation of pixel appearances when movement of viewing point of an observer is followed is obtained for a tone change and a light emission control method of subfields for maximizing the sum of all correlations of pixel appearance when the tone is changed in the ascending order from the lowest tone level to the highest level will be explained.

It is assumed that the pixel arrangement is a digital arrangement with a pitch of p as shown in FIG. 33. The luminant time function in a field when the tone level is on Level k is taken as fk(t) and the pixel appearance when the viewing point moves is takes as gk(x). To obtain the correlation of pixel appearance when the viewing point moves between neighboring lines, the following correlative function Phk is defined.

$$Phk=\int|gk(x-p/2)-gk+1(x)|dx=v\int|fk(t-p/2v)-fk+1(t)|dt$$

If the sum of all the tones in the ascending order is taken as Ph, it is expressed as follows:

$$Ph=\Sigma P_{hk}$$

In this case, the symbol of sum Σ indicates the number from k=0 to k=254. To minimize the correlative function Ph of the sum of tones in the ascending order, the light emission of the most significant subfields is controlled.

In the aforementioned definition of the correlative function, the pixel appearance function when the viewing point moves is taken as g(x) and only x is a variable. However, needless to say, it is possible to define the function as a two-dimensional function of x and y such as g(x,y). In this case, the integral is a double integral. The correlative function is defined as an integral of the absolute value of the difference of two functions. However, it may be defined as an integral of the square value of the difference of two functions.

According to the present invention, a method for dividing the time width in a field of a TV signal into a plurality of subfields in the pixel storing time direction and displaying the tone of a TV image signal by controlling the presence or absence of light emission of the subfields and an apparatus therefor obtain good results of reducing the dynamic false contour noise following movement of the viewing point of an observer remarkably.

What is claimed is:

1. A tone display method for displaying a tone of an image in a display system which divides a time width of a field of an image signal into a plurality of weighted subfields and controls operation of the subfields, the tone display method comprising the steps of:

coding the image signal in the plurality of weighted subfields, the plurality of weighted subfields including a plurality of most significant subfields having respective weights, the respective weights of the most significant subfields being substantially equal to each other, and a plurality of less significant subfields having respective weights, each of the respective weights of the less significant subfields being less than each of the respective weights of the most significant subfields, a sum of all of the respective weights of the less significant subfields being greater than each of the respective weights of the most significant subfields, the coding being chosen from a plurality of codings all representing substantially a same tone level when a tone level of the image signal is not less than each of the respective weights of the most significant subfields; and displaying the image signal coded with the chosen coding.

2. A tone display method according to claim 1, wherein the chosen coding is a coding of a scanning line which is chosen from a plurality of codings of a scanning line all representing substantially a same tone level; and wherein mutually different codings are chosen for adjoining scanning lines of the image signal.

3. A tone display method according to claim 1, wherein the chosen coding is a coding of a pixel which is chosen from a plurality of codings of a pixel all representing substantially a same tone level; and wherein mutually different codings are chosen for adjoining pixels of the image signal.

4. A tone display method according to claim 1, wherein the chosen coding is a coding of a field which is chosen from a plurality of codings of a field all representing substantially a same tone level; and wherein mutually different codings are chosen for adjoining fields of the image signal.

5. A tone display apparatus for displaying a tone of an image in a display system which divides a time width of a field of an image signal into a plurality of weighted subfields and controls operation of the subfields, the tone display apparatus comprising:

a coding circuit which codes the image signal in the plurality of weighted subfields, the plurality of weighted subfields including a plurality of most significant subfields having respective weights, the respective weights of the most significant subfields being substantially equal to each other, and a plurality of less significant subfields having respective weights, each of the respective weights of the less significant subfields being less than each of the respective weights of the most significant subfields, a sum of all of the respective weights of the less significant subfields being greater than each of the respective weights of the most significant subfields, the coding being chosen from a plurality of codings all representing substantially a same tone level when a tone level of the image signal is not less than each of the respective weights of the most significant subfields; and a display circuit which displays the image signal coded with the chosen coding.

6. A tone display apparatus according to claim 5, wherein the chosen coding is a coding of a scanning line which is chosen from a plurality of codings of a scanning line all representing substantially a same tone level; and wherein mutually different codings are chosen for adjoining scanning lines of the image signal.

7. A tone display apparatus according to claim 5, wherein the chosen coding is a coding of a pixel which is chosen from a plurality of codings of a pixel all representing substantially a same tone level; and wherein mutually different codings are chosen for adjoining pixels of the image signal.

8. A tone display apparatus according to claim 5, wherein the chosen coding is a coding of a field which is chosen from a plurality of codings of a field all representing substantially a same tone level; and wherein mutually different codings are chosen for adjoining fields of the image signal.

9. A tone display method for displaying a tone of an image in a display system which divides a time width of a field of an image signal into a plurality of weighted subfields and controls operation of the subfields, the tone display method comprising the steps of:

coding the image signal in the plurality of weighted subfields, the plurality of weighted subfields including a plurality of most significant subfields having respective weights, the respective weights of the most significant subfields being substantially equal to each other, the respective weights of the most significant subfields which are substantially equal to each other being obtained by substantially equally dividing a sum of respective weights of a number n of most significant subfields by a number m which is greater than n when a tone level is expressed with a binary-coded digital signal, the coding being chosen from a plurality of codings all representing substantially a same tone level when a tone level of the image signal is not less than each of the respective weights of the most significant subfields; and displaying the image signal coded with the chosen coding.

10. A tone display method according to claim 9, wherein the plurality of weighted subfields includes 4 most significant subfields; and wherein n=2 and m=4.

* * * * *